US011240390B2

United States Patent
Kubota

(10) Patent No.: US 11,240,390 B2
(45) Date of Patent: Feb. 1, 2022

(54) SERVER APPARATUS, VOICE OPERATION SYSTEM, VOICE OPERATION METHOD, AND RECORDING MEDIUM

(71) Applicant: Hajime Kubota, Kanagawa (JP)

(72) Inventor: Hajime Kubota, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 9 days.

(21) Appl. No.: 16/808,944

(22) Filed: Mar. 4, 2020

(65) Prior Publication Data

US 2020/0304663 A1 Sep. 24, 2020

(30) Foreign Application Priority Data

Mar. 20, 2019 (JP) .............................. JP2019-053901

(51) Int. Cl.
*H04N 1/00* (2006.01)
*G10L 15/00* (2013.01)
(Continued)

(52) U.S. Cl.
CPC ....... *H04N 1/00498* (2013.01); *G10L 15/005* (2013.01); *G10L 15/22* (2013.01);
(Continued)

(58) Field of Classification Search
CPC .......... H04N 1/00498; H04N 1/00403; H04N 1/00411; H04N 1/00514; H04N 21/42203;
(Continued)

(56) References Cited

U.S. PATENT DOCUMENTS

2006/0181750 A1 8/2006 Lu et al.
2009/0204387 A1* 8/2009 Okada .................... G06F 40/58
704/3

(Continued)

FOREIGN PATENT DOCUMENTS

JP 2000-293353 A 10/2000
JP 2000293353 A * 10/2000
(Continued)

OTHER PUBLICATIONS

Extended European Search Report dated Sep. 3, 2020 issued in corresponding European Appln. No. 20161018.5.

*Primary Examiner* — Kent Yip
(74) *Attorney, Agent, or Firm* — Harness, Dickey & Pierce, P.L.C.

(57) ABSTRACT

A server apparatus, a voice operation system, and a voice operation method, each of which: acquires, from an image forming apparatus, a language type of a display language used for display at the image forming apparatus; stores the language type of the display language; acquires, from a speaker, voice operation that instructs to change the display language; identifies a language type of a targeted language based on the voice operation; and determines whether the language type of the display language matches the language type of the targeted language. Based on a determination that the language type of the display language does not match the language type of the targeted language, the server apparatus instructs the image forming apparatus to change from the language type of the display language to the language type of the targeted language. Based on a determination that the language type of the display language matches the language type of the targeted language, the server apparatus disregards the instruction to change the language type of the display language of the image forming apparatus.

19 Claims, 26 Drawing Sheets

(51) Int. Cl.
*G10L 15/22* (2006.01)
*G10L 15/30* (2013.01)

(52) U.S. Cl.
CPC ......... *G10L 15/30* (2013.01); *H04N 1/00403* (2013.01); *H04N 1/00411* (2013.01); *H04N 1/00514* (2013.01); *G10L 2015/223* (2013.01)

(58) Field of Classification Search
CPC ........... H04N 21/4856; H04N 1/00352; H04N 1/00244; H04N 2201/0008; G10L 15/005; G10L 15/22; G10L 15/30; G10L 2015/223
USPC ....................................................... 358/1.15
See application file for complete search history.

(56) References Cited

U.S. PATENT DOCUMENTS

| | | | |
|---|---|---|---|
| 2014/0185095 | A1 | 7/2014 | Kawakami et al. |
| 2015/0062605 | A1* | 3/2015 | McKinney ......... H04N 1/00498 358/1.13 |
| 2015/0242754 | A1 | 8/2015 | Fukuda et al. |
| 2015/0317109 | A1 | 11/2015 | Kirihata |
| 2015/0379986 | A1* | 12/2015 | Golding .................. G10L 15/08 704/246 |
| 2019/0304453 | A1 | 10/2019 | Nakamura |
| 2020/0076969 | A1* | 3/2020 | Ikeda .................... G06F 3/1285 |

FOREIGN PATENT DOCUMENTS

| | | |
|---|---|---|
| JP | 2003-051887 | 2/2003 |
| JP | 2015-161745 | 9/2015 |

* cited by examiner

FIG. 9

| printColor | |
|---|---|
| ☑ Define synonyms ⓘ  ☐ Allow automated expansion | |
| auto_color | auto_color |
| monochrome | monochrome, black and white |
| color | color, full color |
| two_color | two color |
| single color | single color |
| red_and_black | red and black |

FIG. 10A

| " Add user expression |
|---|
| " Please copy this by setting of two color, double sides and 2 in 1. |
| " Please copy this document by setting of Tray 1, fitting, and double sides. |
| " Make two copies of this document by monochrome and dark. |
| " Make three copies with 4 in 1. |
| " Execute copy by setting of color and auto tray. |
| " Please Copy this document with 80% on Tray 1. |
| " Copy dark on one side |
| " copy by black and white and dark. |

FIG. 10B

Action

| copy |
|---|

FIG. 10C

RELATED PARAMETER

| Entity | | ENTITY | VALUE |
|---|---|---|---|
| ☐ | copies | @copies | $copies |
| ☐ | paperTray | @paperTray | $paperTray |
| ☐ | magnification | @magnification | $magnification |
| ☐ | printColor | @printColor | $printColor |
| ☐ | printSide | @printSide | $printSide |
| ☐ | combine | @combine | $combine |
| ☐ | density | @density | $density |
| | ... | ... | ... |

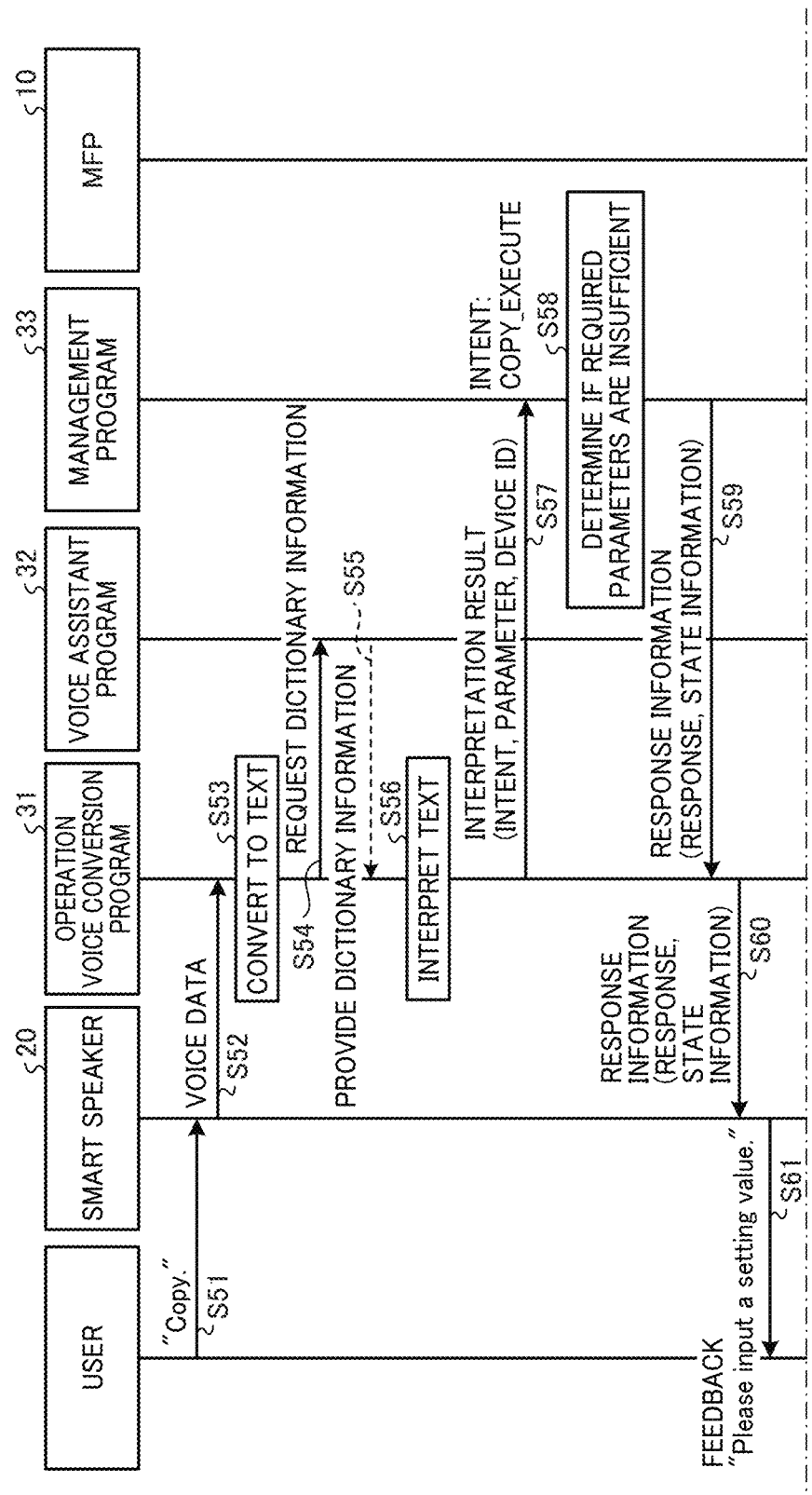

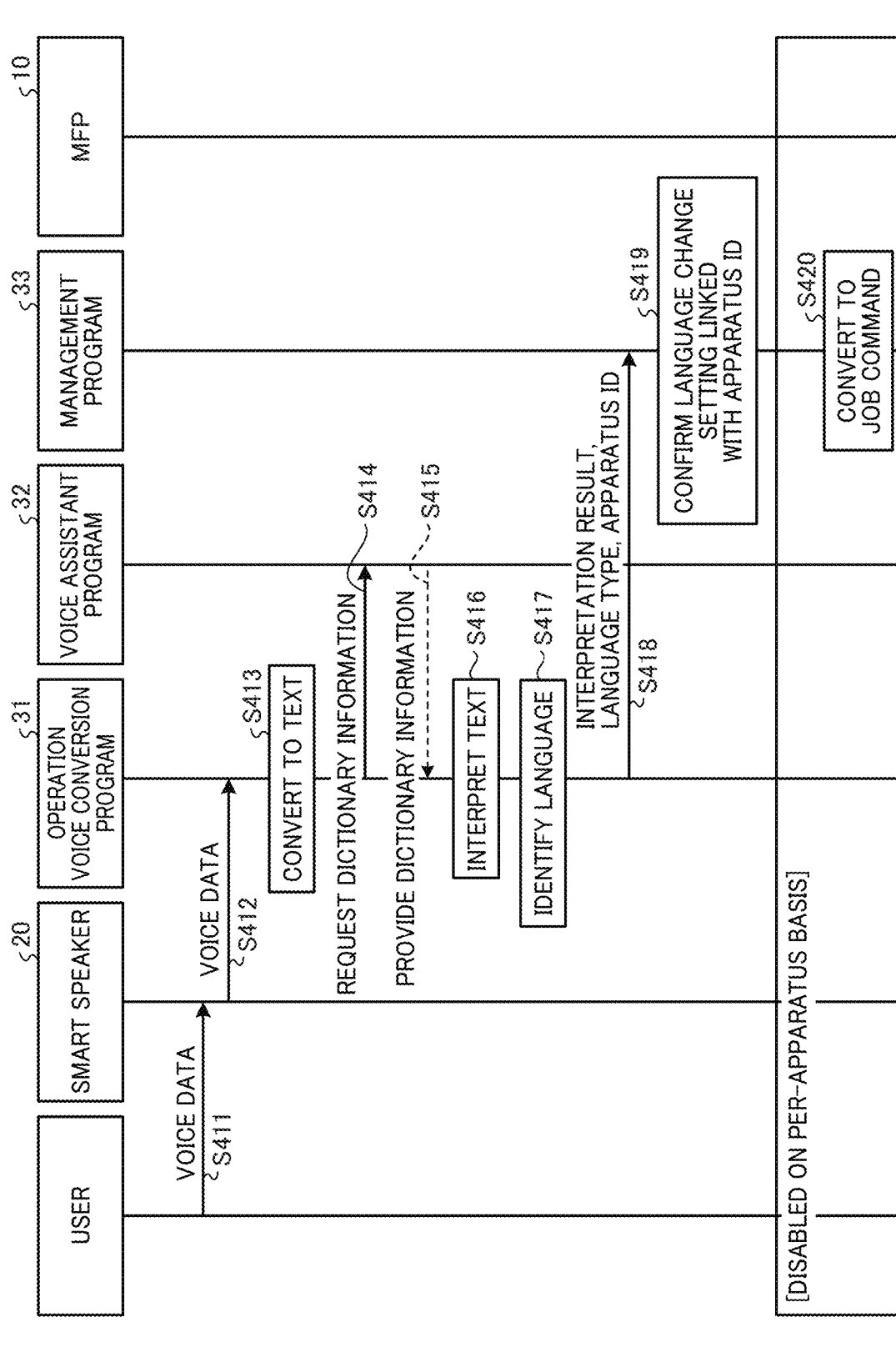

SERVER APPARATUS, VOICE OPERATION SYSTEM, VOICE OPERATION METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2019-053901, filed on Mar. 20, 2019, in the Japan Patent Office, the entire disclosure of which is hereby incorporated by reference herein.

BACKGROUND

Technical Field

The present invention relates to a server apparatus, a voice operation system, a voice operation method, and recording medium

Description of the Related Art

Conventionally, a smart speaker for searching information and operating various pieces of equipment by interactive voice operation has been known.

In addition, image forming apparatuses such as multi-function peripherals (MFPs) are manually operated with the use of a graphical user interface (GUI). For example, in an image forming apparatus, the language used to display a GUI (display language) can be changed with the use of the GUI.

When the image forming apparatus is operated via the smart speaker described above, it is conceivable to change the display language of the image forming apparatus by voice operation. However, conventionally, such a method for changing the display language has not been considered. For example, when the same language type as the display language used in the image forming apparatus is specified as the targeted language type via the smart speaker, unnecessary processing may occur in the image forming apparatus.

SUMMARY

Example embodiments include a server apparatus, a voice operation system, and a voice operation method, each of which: acquires, from the image forming apparatus, a language type of a display language used for display at the image forming apparatus; stores the language type of the display language; acquires, from the speaker, voice operation that instructs to change the display language; identifies a language type of a targeted language based on the voice operation; and determines whether the language type of the display language matches the language type of the targeted language. When it is determined that the language type of the display language does not match the language type of the targeted language, the server apparatus instructs the image forming apparatus to change from the language type of the display language to the language type of the targeted language. When it is determined that the language type of the display language matches the language type of the targeted language, the server apparatus disregards the instruction to change the language type of the display language of the image forming apparatus. Example embodiments include a non-transitory recording medium storing a control program for causing the above-described voice operation method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 9 is a diagram illustrating an example of entity information;

FIGS. 10A to 10C are diagrams illustrating an example of entity information registered based on an utterance phrase;

FIGS. 13A and 13B (FIG. 13) are a sequence diagram illustrating an example of a copy setting process by a voice operation executed by the voice operation system according to the present embodiment;

FIGS. 25A and 25B (FIG. 25) are a sequence diagram illustrating an example of a display language change process by a second change method executed by the voice operation system according to the variation of FIG. 24.

Figure 1:
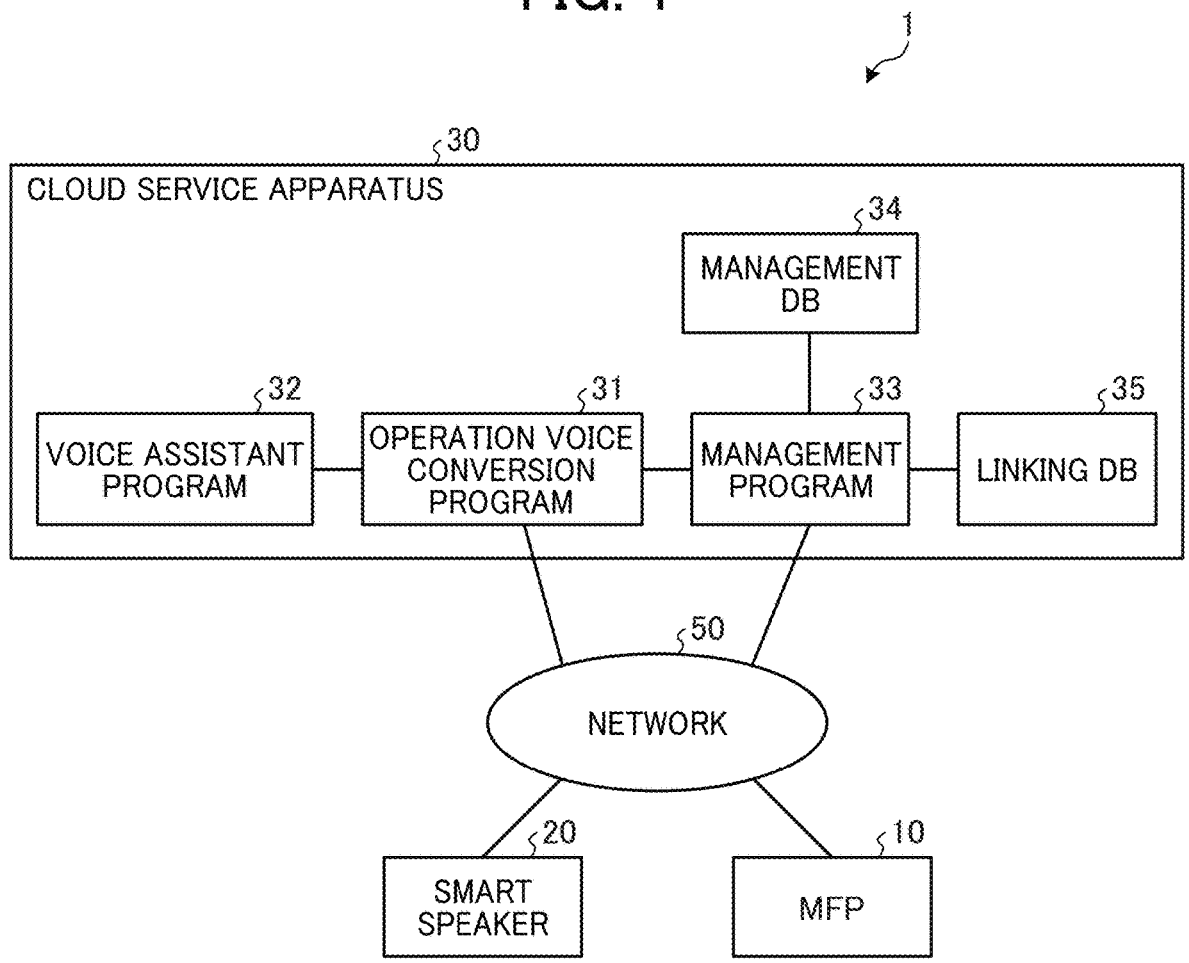
FIG. 1 is a diagram illustrating an example of a configuration of a voice operation system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, an embodiment of a voice operation system, a voice operation method, and a voice operation program will be described in detail with reference to the accompanying drawings. The embodiment described below is an embodiment of a voice operation system, a voice operation method, and a voice operation program, and does not limit the configuration and specifications.

In this disclosure, voice operation refers to operation performed by a user to give an instruction by voice.

System Configuration

FIG. 1 is a diagram illustrating an example of a voice operation system 1 according to the present embodiment. As illustrated in FIG. 1, the voice operation system 1 includes one or more multifunction peripherals (MFPs) 10, one or more smart speakers 20 and a cloud service apparatus 30. The MFP 10, smart speaker 20 and cloud service apparatus 30 are connected via a network 50 such as a local area network (LAN).

The smart speaker 20 interacts with a user to input and output various information. In the present embodiment, while the smart speaker 20 will be described as an example, equipment such as a smart phone, a tablet terminal, and a personal computer may be also applicable. The smart speaker 20 accepts a voice input from the user to operate the MFP 10 by voice. The smart speaker 20 may output sound to the user. In addition, the smart speaker 20 may output voice to the user. Moreover, the smart speaker 20 communicates data with the cloud service apparatus 30 (for example, transmission and reception of voice data, text data, image data, and the like).

The cloud service apparatus 30 includes one or more server apparatuses. The cloud service apparatus 30 analyzes voice data received from the smart speaker 20 and converts the voice data to text data. In addition, the cloud service apparatus 30 interprets the user's intention based on text data and the pre-registered dictionary information, converts the interpretation result into a job execution command that can be interpreted by the MFP 10 and transmits the job execution command to the MFP 10. Moreover, the cloud service apparatus includes an operation voice conversion program 31, a voice assistant program 32, a management program 33, a management database (DB) 34, and a linking DB 35. The details of these will be described later.

The MFP 10 is a multifunction machine including a plurality of functions such as a printer function and a scan function. That is, the MFP 10 is an image forming apparatus. The MFP 10 executes a job execution command transmitted from the cloud service apparatus 30. Hardware Configuration of MFP 10

Figure 2:
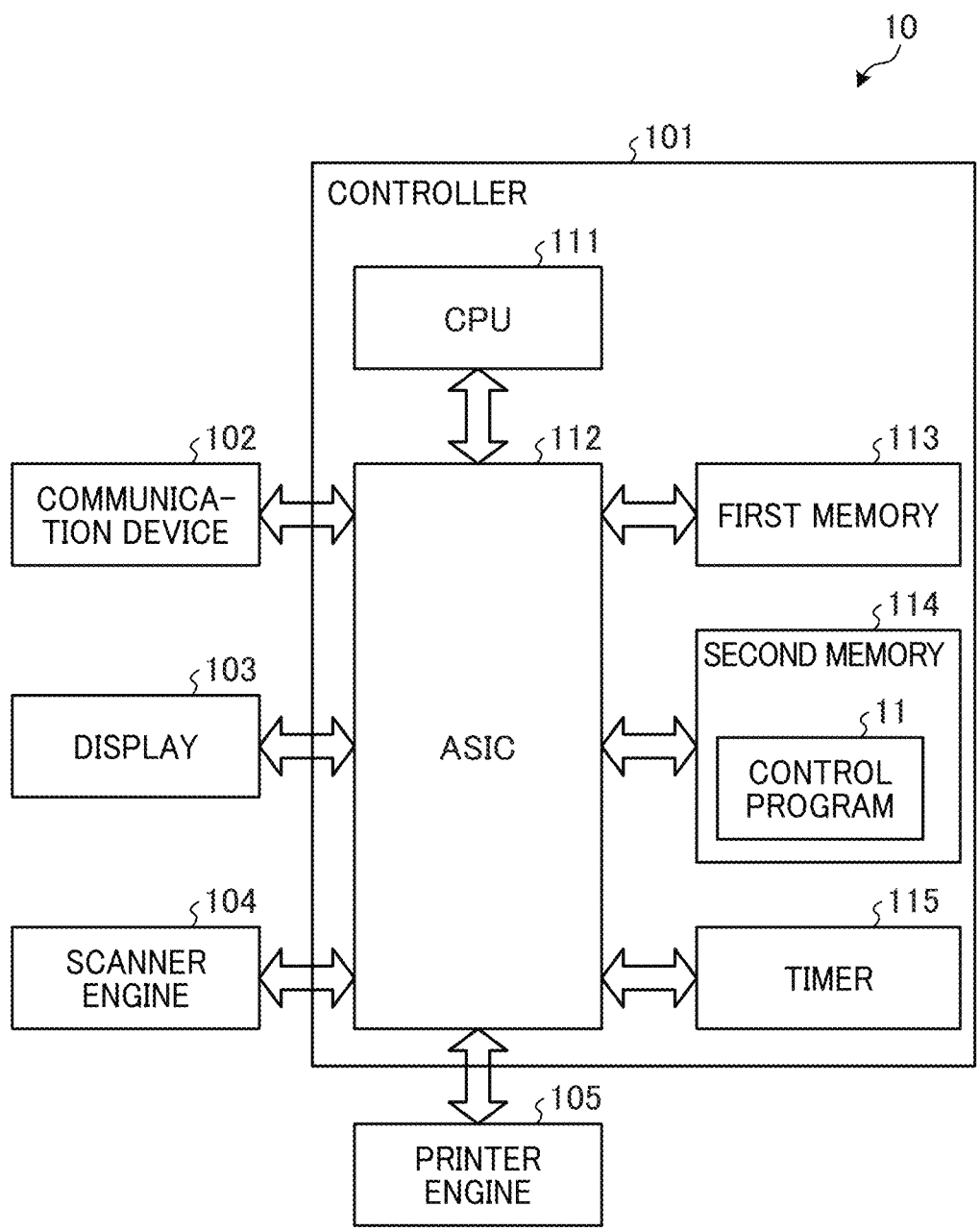
FIG. 2 is a diagram illustrating an example of a hardware configuration of an MFP of FIG. 1.

FIG. 2 is a diagram illustrating an example of a hardware configuration of the MFP 10. The MFP 10 includes a controller 101, a communication device 102, a display 103, a scanner engine 104, and a printer engine 105.

The controller 101 includes a central processing unit (CPU) 111, an application specific integrated circuit (ASIC) 112, a first memory 113, a second memory 114, and a timer 115. Each of these components are communicably connected to one another via a bus line.

The CPU 111 centrally controls the MFP 10. The ASIC 112 is, for example, a large-scale integrated circuit (LSI). The ASIC 112 performs various image processing on images processed by the scanner engine 104 and the printer engine 105.

The first memory 113 is a volatile semiconductor memory that temporarily holds programs and data. The second memory 114 is a non-volatile memory such as a hard disk drive (HDD) or a solid state drive (SSD). For example, the second memory 114 stores a control program 11 and the like. The CPU 111 executes the control program 11 to cause the MFP 10 to perform various functions of the MFP 10. The timer 115 counts time.

The communication device 102, which may be implemented by a network interface circuit, performs communication with each apparatus connected to, for example, the network 50. The communication device 102 acquires a job execution command such as a scan instruction and a print instruction.

The display 103 is, for example, a touch panel in which a liquid crystal display (LCD) and a touch sensor are integrally formed. The display 103 accepts an operation when a user touches a displayed operation button or the like.

The scanner engine 104 controls a scanner to optically read an original. The printer engine 105 controls a plotter to print an image on, for example, a transfer paper.

Hardware Configuration of Smart Speaker 20

Figure 3:
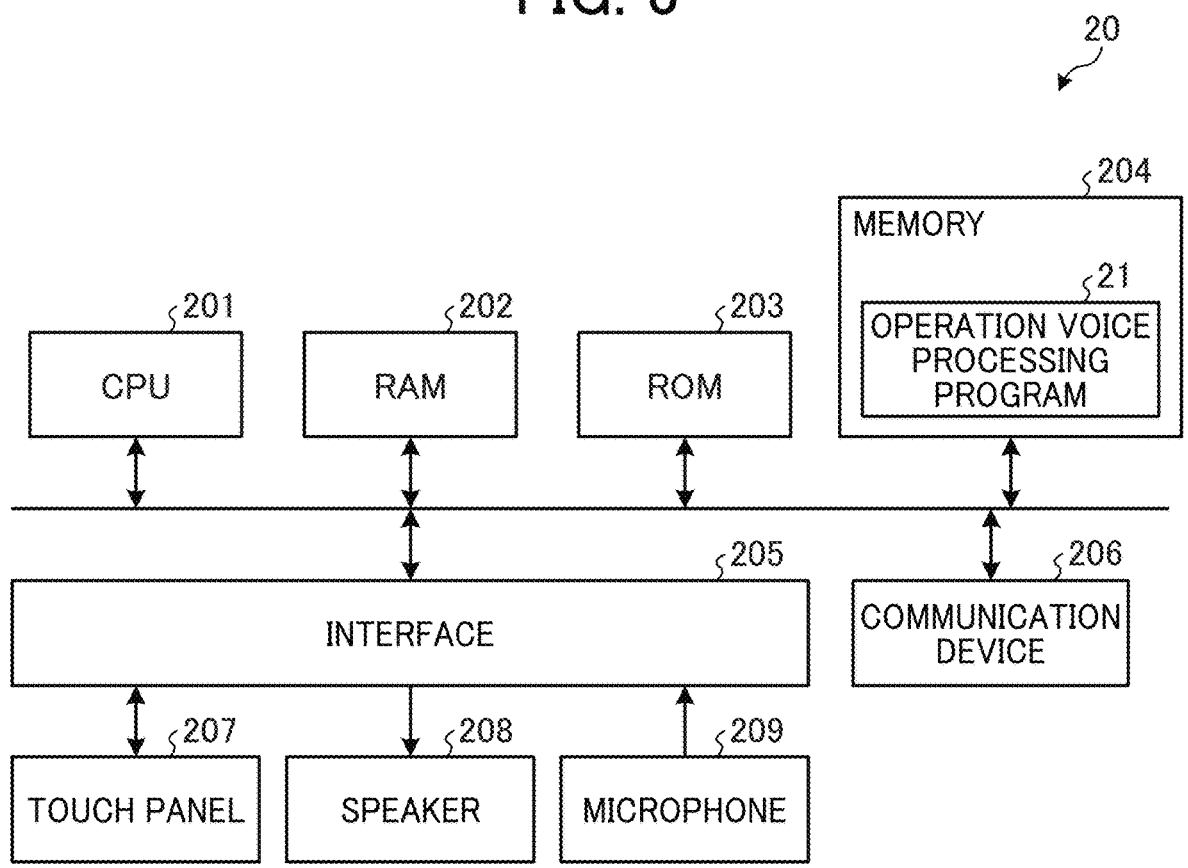
FIG. 3 is a diagram illustrating an example of a hardware configuration of a smart speaker of FIG. 1.

FIG. 3 is a diagram illustrating an example of a hardware configuration of the smart speaker 20. The smart speaker 20 includes a CPU 201, a random access memory (RAM) 202, a read only memory (ROM) 203, a memory 204, an interface 205, a communication device 206, a touch panel 207, a speaker 208, and a microphone 209. Each of these components are communicably connected to one another via a bus line.

The CPU 201 controls the smart speaker 20 in an integrated manner. The RAM 202 is a volatile semiconductor memory that temporarily holds programs and data. The ROM 203 is a non-volatile semiconductor memory that stores programs and data.

The memory 204 operates an auxiliary memory, and is, for example, a flash memory. The memory 204 stores an operation voice processing program 21.

The CPU 201 executes the operation voice processing program 21, to control various processes. For example, the CPU 201 controls acquisition of voice information from the microphone 209. In addition, the CPU 201 controls transmission of the acquired voice information to the cloud service apparatus 30. Furthermore, the CPU 201 controls display output by the touch panel 207 of the data (voice data, text data, image data, etc.) acquired from the cloud service apparatus 30 and voice output by the speaker 208.

The touch panel 207, speaker 208, and microphone 209 are connected to the interface 205. The touch panel 207 includes, for example, a liquid crystal display and a touch sensor that are integrally formed. The speaker 208 outputs voice. The microphone 209 collects (acquires) sound. The microphone 209 collects (acquires), for example, an input voice of a job execution command for the MFP 10. The input voice is transmitted to the cloud service apparatus 30 via the communication device 206.

The communication device 206 performs communication with each apparatus connected, for example, to the network 50.

Hardware Configuration of Cloud Service Apparatus 30

Figure 4:
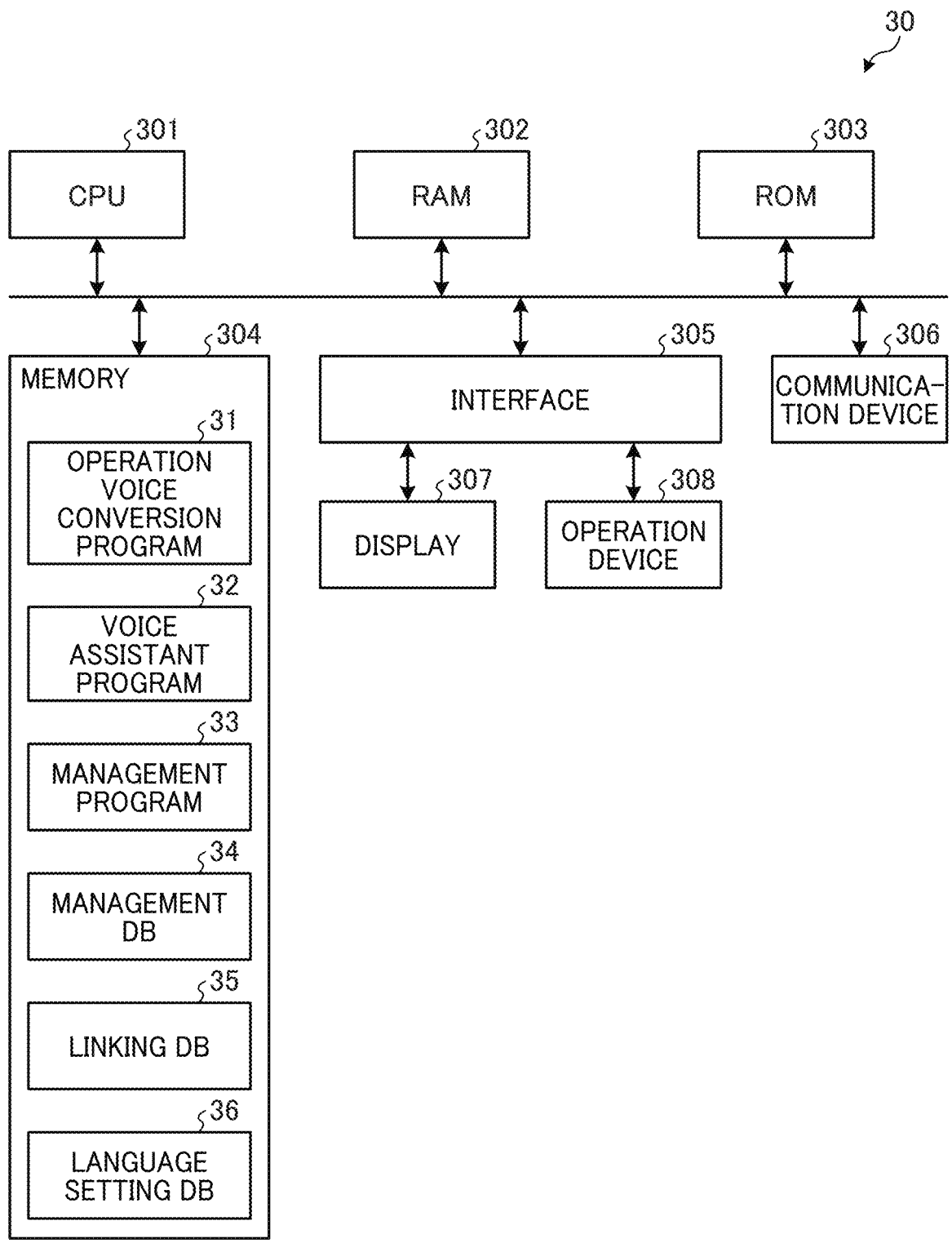
FIG. 4 is a diagram illustrating an example of a hardware configuration of a cloud service apparatus of FIG. 1.

FIG. 4 is a diagram illustrating an example of a hardware configuration of the cloud service apparatus 30. The cloud service apparatus 30 includes a CPU 301, a RAM 302, a ROM 303, a memory 304, an interface 305, a communication device 306, a display 307, and an operation device 308. Each of these components are communicably connected to one another via a bus line.

The CPU 301 centrally controls the cloud service apparatus 30. The CPU 301 executes programs stored in the memory 304 and the like. The RAM 302 is a volatile semiconductor memory that temporarily holds programs and data. The ROM 303 is a non-volatile semiconductor memory that stores programs and data.

The memory 304 is, for example, an HDD or an SSD. The memory 304 stores an operation voice conversion program 31, a voice assistant program 32, and a management program 33.

The operation voice conversion program 31 converts voice data into text data, and determines whether the text data matches pre-defined dictionary information. When the text data matches, the operation voice conversion program 31 converts the text data to an intent indicating the intention of the user and a parameter indicating a variable such as a job condition. The voice assistant program 32 holds dictionary information. The management program 33 converts the intent and parameter into a job execution command that can be interpreted by the MFP 10 and transmits the job execution command to the registered MFP 10.

The operation voice conversion program 31, voice assistant program 32, and management program 33 may be executed by one server, may be implemented by different servers, or may be executed by a plurality of servers working together.

In addition, the memory 304 stores, for example, the management DB 34, the linking DB 35, and a language setting DB 36 as data used by the operation voice conversion program 31, voice assistant program 32, and management program 33.

The management DB 34 stores data related to the content provided by the cloud service apparatus 30, such as text data, image data, and voice data. In addition, the linking DB stores the information of an external apparatus such as an MFP 10 that is linked to the smart speaker 20. The linking DB 35 stores, for example, an ID for identifying the smart speaker 20 (hereinafter, device ID) and an ID for identifying an external apparatus such as the MFP 10 (hereinafter, apparatus ID) in association with each other. The language setting DB 36 stores, for each external apparatus such as the MFP 10, the language type of the language used for display in the external apparatus. The language setting DB 36 is an example of the language setting storage. The language setting DB 36 stores, for example, an apparatus ID for identifying an external apparatus such as the MFP 10 and a language setting indicating a language type (for example, a language code or a locale ID) in association with each other. A part or all of the management DB 34, linking DB 35, and language setting DB 36 may be stored in another server accessible from the cloud service apparatus 30 via the network 50.

The display 307 and the operation device 308 are connected to the interface 305. The display 307 is, for example, a liquid crystal display (LCD). The operation device 308 is an input device such as a keyboard or a mouse.

The communication device 306 performs communication with each apparatus connected to the network 50.

Functions of MFP

Figure 5:
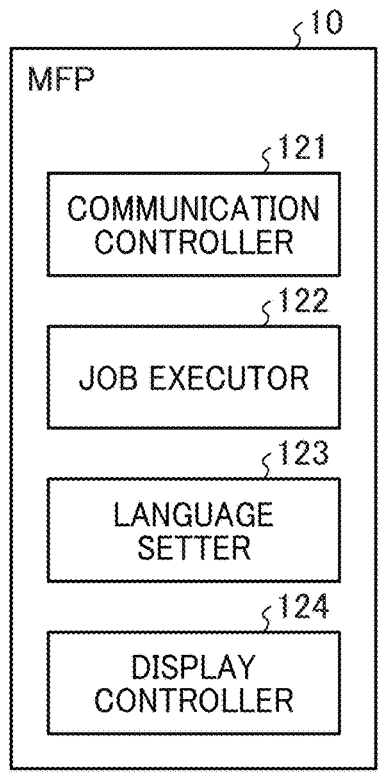
FIG. 5 is a block diagram illustrating an example of a functional configuration of the MFP of FIG. 2.

FIG. 5 is a block diagram illustrating an example of a functional configuration of the MFP 10. The CPU 111 of the MFP 10 executes the control program 11 stored in the second memory 114, thereby functioning as a communication controller 121, a job executor 122, a language setter 123, and a display controller 124, as illustrated in FIG. 5.

The communication controller 121 controls the communication device 102 to perform communication with each apparatus connected to the network 50. For example, the communication controller 121 receives a job command executed by the MFP 10, a language type (language change instruction) specifying a language to be displayed by the MFP 10, and the like.

When receiving the job command, the job executor 122 executes a job indicated by the job command. For example, the job executor 122 executes a printer function or a scan function based on the job command.

The language setter 123 changes the language setting of the screen displayed on the display 103. For example, when the communication controller 121 receives a language change instruction, the language setter 123 changes the language setting to the language type specified by the language change instruction.

The display controller 124 controls the display 103 included in the MFP 10 to display a screen expressed in the language type of the voice operation accepted by the smart speaker 20. For example, the display 103 displays a screen expressed in the language type identified by the language setting set as the language type that can be interpreted by the speaker.

In this example, the communication controller 121, job executor 122, language setter 123, and display controller 124 are implemented by software. However, a part or all of these may be implemented by hardware such as an integrated circuit (IC). In addition, the functions implemented by the communication controller 121, job executor 122, language setter 123, and display controller 124 may be implemented by the control program 11 alone. Another program may perform a part of a process, or the process may be performed indirectly with the use of another program.

Functions of Smart Speaker

Figure 6:
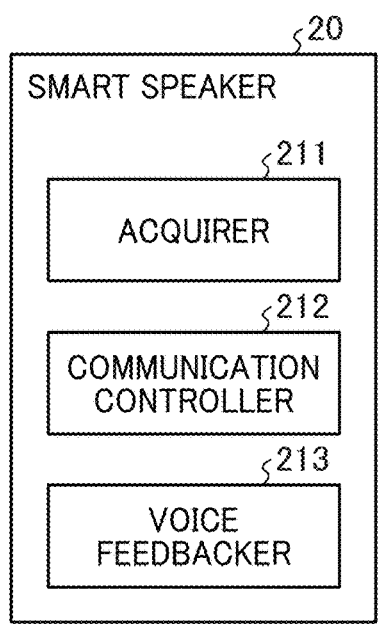
FIG. 6 is a block diagram illustrating an example of a functional configuration of the smart speaker of FIG. 3.

FIG. 6 is a block diagram illustrating an example of a functional configuration of the smart speaker 20. The CPU 201 of the smart speaker 20 executes the operation voice processing program 21 stored in the memory 204, thereby functioning as an acquirer 211, a communication controller 212, and a voice feedbacker 213, as illustrated in FIG. 6.

The acquirer 211 acquires the instruction voice of the user who operates the MFP 10 via the microphone 209. The acquirer 211 may acquire a user operation via the touch panel 207, a physical switch, or the like, not limited to the microphone 209.

The communication controller 212 controls communication between the smart speaker 20 and the cloud service apparatus 30. The communication controller 212 transmits the information acquired by the acquirer 211 to the cloud service apparatus 30, and acquires text data, image data, and voice data from the cloud service apparatus 30. In addition, when transmitting the information acquired by the acquirer 211 to the cloud service apparatus 30, the communication controller 212 may transmit a device ID for identifying the smart speaker 20.

The voice feedbacker 213 controls the speaker 208 to implement interactive voice operation, and feeds back voice to the user, that is, outputs voice. For example, the voice feedbacker 213 feeds back voice that prompts for a voice input to supplement missing data, or feeds back voice that confirms a voice input. The voice feedbacker 213 may control the touch panel 207 to feed back a text or an image to the user.

In this example, the acquirer 211, communication controller 212, and voice feedbacker 213 are implemented by software. However, a part or all of these may be implemented by hardware such as an IC. In addition, the functions implemented by the acquirer 211, communication controller 212, and voice feedbacker 213 may be implemented by the operation voice conversion program 31 alone. Another program may perform a part of a process, or the process may be performed indirectly with the use of another program.

Functions of Cloud Service Apparatus

Figure 7:
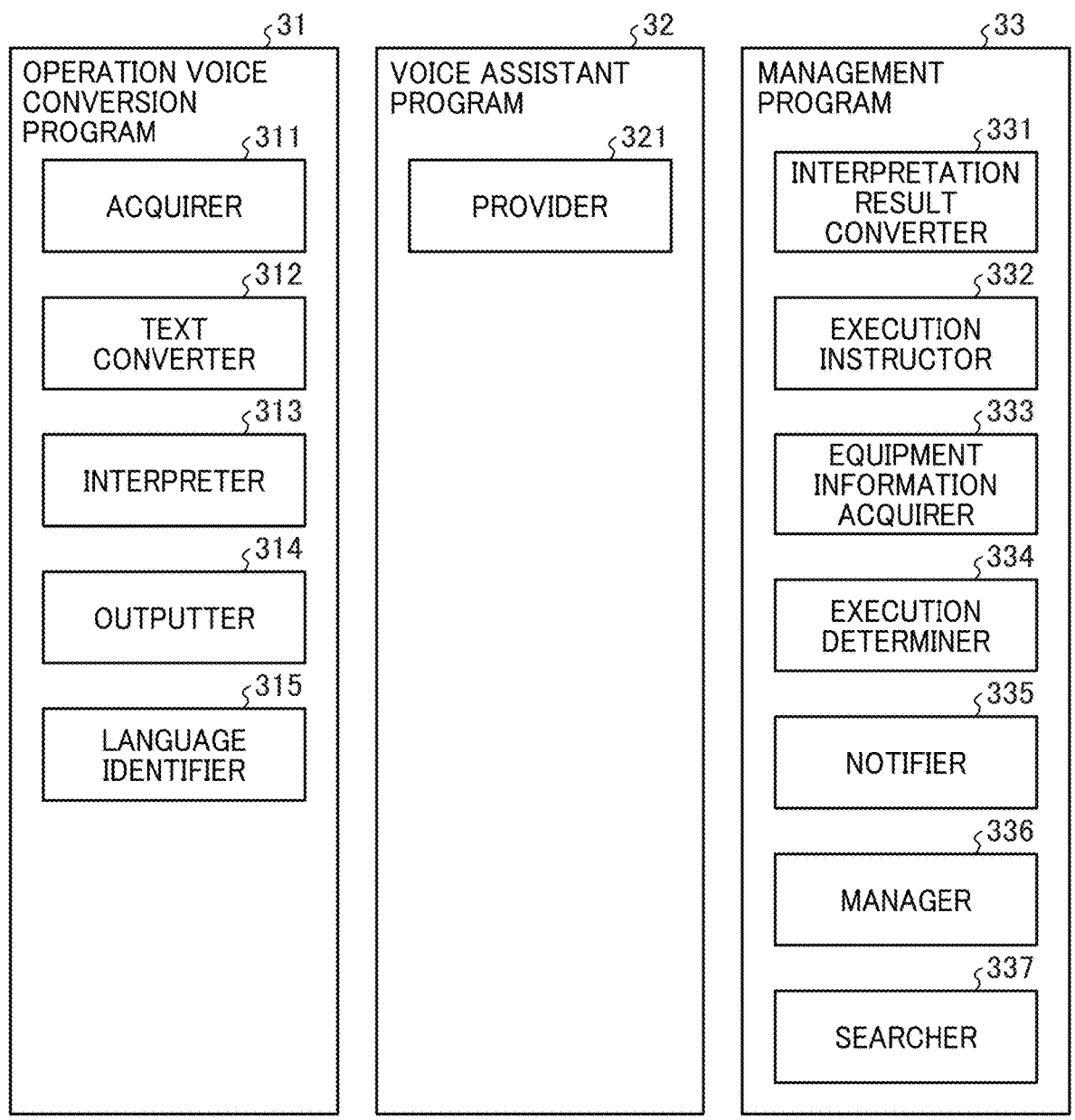
FIG. 7 is a block diagram illustrating an example of a functional configuration of the cloud service apparatus of FIG. 4.

FIG. 7 is a block diagram illustrating an example of a functional configuration of the cloud service apparatus 30. The CPU 301 of the cloud service apparatus 30 executes the operation voice conversion program 31 stored in the memory 304, thereby functioning as an acquirer 311, a text converter 312, an interpreter 313, an output 314, and a language identifier 315, as illustrated in FIG. 7.

The acquirer 311 acquires voice operation information such as voice data indicating the voice operation of the user, which is accepted by the smart speaker 20. That is, the acquirer 311 acquires voice data input by the user, which is transmitted from the smart speaker 20. In addition, the acquirer 311 may acquire not only voice data but also a user operation for a touch panel 207 button or switch of the smart speaker 20.

The text converter 312 converts voice data input by the user into text data.

The interpreter 313 interprets the instruction from the user on the basis of the text data. Specifically, the interpreter 313 determines whether a word or the like included in the text data matches the dictionary information on the basis of the dictionary information provided from the voice assistant program 32. If the word or the like matches the dictionary information, the interpreter 313 converts the word or the like into an intent indicating the intention of the user and a parameter indicating a variable such as a job condition. The interpreter 313 transmits the intent and parameter to the management program 33. In doing so, the interpreter 313 transmits the intent and parameter together with a device ID for identifying the smart speaker 20 from which the voice data is acquired.

The outputter 314 controls the communication device 306 to perform communication. For example, the outputter 314 executes transmission of data such as text data, voice data, and image data to the smart speaker 20.

The language identifier 315 identifies a language type change request or a targeted language type on the basis of the voice operation accepted by the smart speaker 20. More specifically, the language identifier 315 identifies a word or phrase used to request the change of the language type from the text data converted by the text converter 312, the processing result of the text data interpreted by the interpreter 313, and the like, and identifies a targeted language type. Then, the MFP 10 displays a screen on which various words or phrases are expressed in the targeted language specified by the voice operation accepted by the smart speaker 20. That is, the language identifier 315 changes the setting of the language type of the screen displayed on the MFP 10.

In this example, the acquirer 311, text converter 312, interpreter 313, outputter 314, and language identifier 315 are implemented by software. However, a part or all of these may be implemented by hardware such as an IC. In addition, the functions implemented by the acquirer 311, text converter 312, interpreter 313, outputter 314, and language identifier 315 may be implemented by the operation voice conversion program 31 alone. Another program may perform a part of a process, or the process may be performed indirectly with the use of another program.

For example, a part or all of the functions of the interpreter 313 of the operation voice conversion program 31 may be executed by the voice assistant program 32. In this case, the voice assistant program 32 determines, for example, whether a word or the like included in the text data matches the dictionary information. In addition, when the word or the like matches the dictionary information, the voice assistant program 32 performs a conversion into an intent indicating the intention of the user and a parameter indicating a variable such as a job condition. Then, the interpreter 313 may acquire the intent and parameter from the voice assistant program 32.

The CPU 301 of the cloud service apparatus 30 executes the voice assistant program 32 stored in the memory 304, thereby functioning as a provider 321, as illustrated in FIG. 7.

The provider 321 manages the dictionary information in which the relation between the text data, intent, and parameter is defined in advance, and provides the dictionary information to the operation voice conversion program 31. In addition, the provider 321 may interpret the operation instruction from the user on the basis of the text data. Specifically, the provider 321 acquires text data from the operation voice conversion program 31 and determines whether a word or the like included in the text data matches the dictionary information. When the word or the like matches the dictionary information, the provider 321 converts the text data into an intent and a parameter. After that, the provider 321 provides the intent and parameter to the operation voice conversion program 31.

In this example, the provider 321 is implemented by software. However, a part or all of these may be implemented by hardware such as an IC. In addition, the functions implemented by the provider 321 may be implemented by the voice assistant program 32 alone. Another program may perform a part of a process, or the process may be performed indirectly with the use of another program.

The CPU 301 of the cloud service apparatus 30 executes the management program 33 stored in the memory 304, thereby functioning as an interpretation result converter 331, an execution instructor 332, an equipment information acquirer 333, an execution determiner 334, a notifier 335, a manager 336, and a searcher 337, as illustrated in FIG. 7.

The interpretation result converter 331 converts the interpretation result of the intent and parameters converted by the operation voice conversion program 31 into a job execution command that can be interpreted by the MFP 10.

The execution instructor 332 transmits the job execution command to the MFP 10 and instructs execution of the job. The execution instructor 332 transmits the job execution command to the MFP 10 corresponding to the smart speaker 20 identified by the linking DB 35. In other words, the execution instructor 332 acquires a device ID for identifying the smart speaker 20 used by the user together with the intent and parameter. The execution instructor 332 searches the MFP 10 corresponding to the acquired device ID from the linking DB 35. The execution instructor 332 transmits the job execution command to the searched MFP 10.

The equipment information acquirer 333 acquires information on the MFP 10 from the MFP 10. The equipment information acquirer 333 acquires, from the MFP 10, processing capability such as the maximum number of pixels that can be processed. When acquiring the processing capability from a plurality of external apparatuses including the MFP 10, the equipment information acquirer 333 stores the processing capability in the memory 304 in link with information such as an apparatus ID for identifying an external apparatus. In addition, the equipment information acquirer 333 acquires an equipment state. The equipment state is information including a connection state indicating whether the communication connection with the MFP 10 has been established, a power state indicating whether the power of the MFP 10 is ON/OFF or whether the MFP is in a sleep mode, the presence/absence and a type of an error, a remaining state of consumables such as paper and toner, a user login state, authority information indicating the functions permitted to use for a log in user, and the like.

The execution determiner 334 compares the processing capability of the MFP 10 with a job specified by the user (that is, the intent and parameter generated by the operation voice conversion program 31), thereby determining whether the job specified by the user can be executed by the MFP 10. When determining that the job specified by the user is executable, the execution determiner 334 transmits a job execution command to the MFP 10. On the other hand, when determining that the job specified by the user is unexecutable, the execution determiner 334 causes the smart speaker 20 to feedback an error message or the like as response information via the operation voice conversion program 31.

The notifier 335 transmits text data, voice data, image data, or the like to the operation voice conversion program 31 in response to the user's job execution instruction. In addition, when a parameter indicating a job condition for executing the job is insufficient, the notifier 335 performs feedback to the smart speaker 20 via the operation voice conversion program 31 to prompt the user to input a parameter. Here, the notifier 335 may transmit parameter information as information required for confirming a missing parameter, or text data, voice data, or image data as information required for prompting the user to specify a parameter.

The manager 336 manages the data of the management DB 34, linking DB 35, and language setting DB 36. For example, the manager 336 registers, in the management DB 34, the device ID of the smart speaker 20 and the apparatus ID of the MFP 10 in link with each other on the basis of information and instructions input to a client device connected to the MFP 10, smart speaker 20, or cloud service apparatus 30. In addition, the linking DB 35 holds, for example, table data as information in which the device ID of the smart speaker 20 and the apparatus ID of the MFP 10 are linked with each other.

The searcher 337 searches for a specified file or the like from the memory 304 or the management DB 34. The searcher 337 may search a file or the like from not only the memory 304, but also from another storage device or a server or the like connected via the network 50.

In this example, the interpretation result converter 331, execution instructor 332, equipment information acquirer 333, execution determiner 334, notifier 335, manager 336, and searcher 337 are implemented by software. However, a part or all of these may be implemented by hardware such as an IC. In addition, the functions implemented by the interpretation result converter 331, execution instructor 332, equipment information acquirer 333, execution determiner 334, notifier 335, manager 336, and searcher 337 may be implemented by the management program 33 alone. Another program may perform a part of a process, or the process may be performed indirectly with the use of another program.

In addition, the operation voice conversion program 31, voice assistant program 32, and management program 33 may be provided in the form of a file in an installable format or an executable format, being recorded on a recording medium readable by a computer device such as a Compact Disc Read Only Memory (CD-ROM) or a flexible disk (FD). In addition, the operation voice conversion program 31, voice assistant program 32, and management program 33 may be provided being recorded on a recording medium readable by a computer device such as a Compact Disc Recordable (CD-R), a Digital Versatile Disc (DVD), a Blu-ray Disc (registered trademark), and a semiconductor memory. Moreover, the operation voice conversion program 31, voice assistant program 32, and management program 33 may be provided in the form of installation via a network such as the Internet, or may be provided by being incorporated in a ROM or the like in equipment in advance.

Voice Operation

Figure 8:
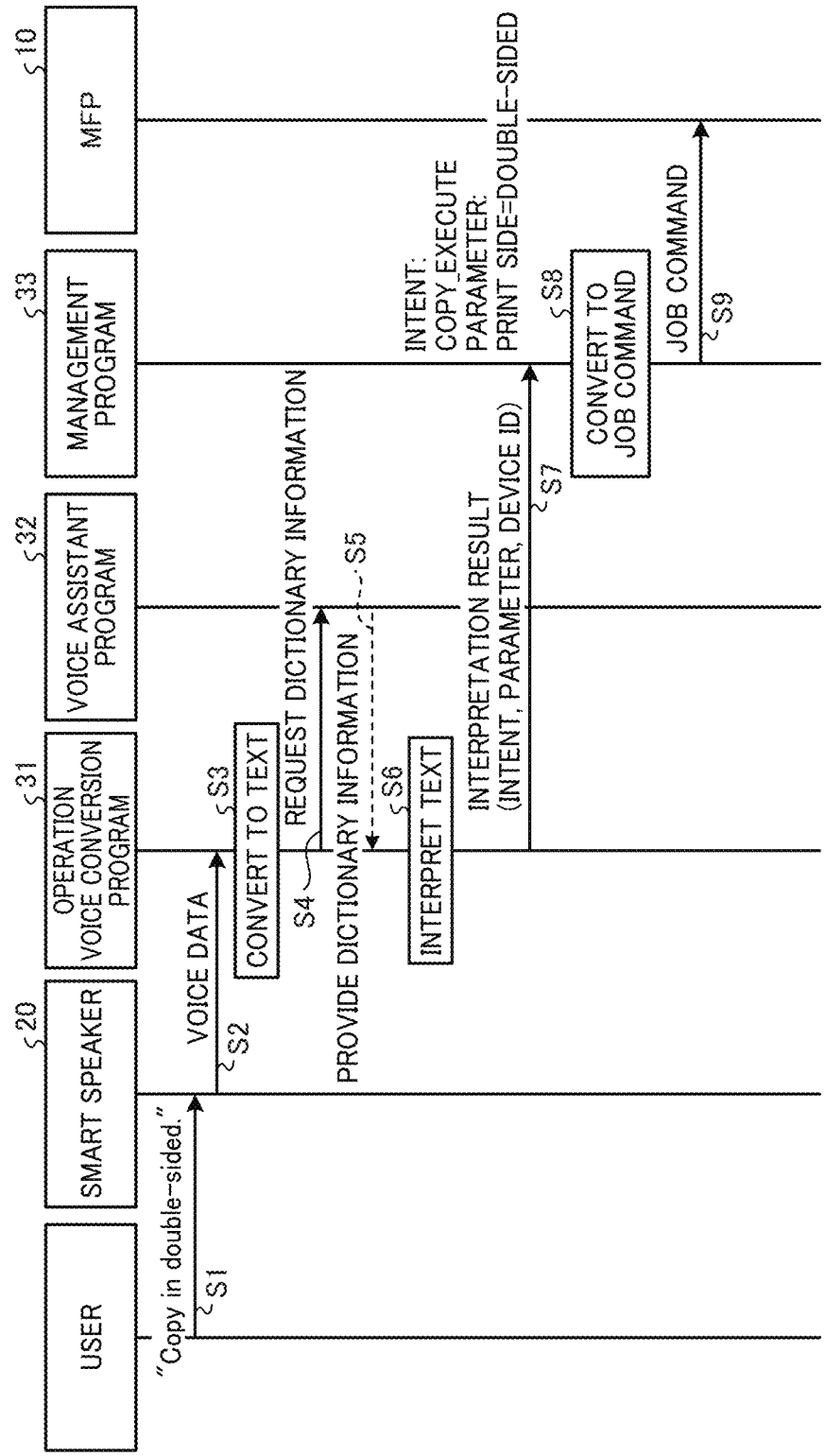
FIG. 8 is a sequence diagram illustrating operation of processing voice operation.

FIG. 8 is a sequence diagram illustrating operation of processing in response to a user instruction by voice. FIG. 8 is an example in which the double-sided copy function of the MFP 10 is operated by voice via the smart speaker 20.

According to user operation, the smart speaker 20 activates the operation voice processing program 21. For example, the user utters "Copy in double-sided" (step S1). Here, the operation voice conversion program 31 may be activated at the same time as the activation of the smart speaker 20, or may be activated by performing a predetermined operation or a predetermined voice input on the smart speaker 20. The acquirer 211 of the smart speaker 20 acquires the voice of the user collected by the microphone 209.

The communication controller 212 of the smart speaker 20 transmits the voice data "Copy in double-sided" acquired by the acquirer 211 to the operation voice conversion program 31, executed by the CPU 301 of the cloud service apparatus 30 (step S2). In doing so, the communication controller 212 may transmit the device ID for identifying the smart speaker 20 to the cloud service apparatus 30.

The text converter 312 of the operation voice conversion program 31 converts the voice data "Copy in double-sided" to text data (step S3).

The interpreter 313 of the operation voice conversion program 31 requests the dictionary information from the voice assistant program 32 (step S4). In addition, the interpreter 313 receives the dictionary information from the voice assistant program 32 (step S5). The interpreter 313 of the operation voice conversion program 31 interprets the text data on the basis of the dictionary information provided from the voice assistant program 32 (step S6).

In this example, the interpreter 313 interprets that the operation for requesting the MFP 10 to execute is "copy (intent: COPY_EXECUTE)" and "the print side is double-sided (print side=double-sided)". In this manner, the interpreter 313 generates the interpretation result indicating the job type (intent) and the content (parameter) specified by the user on the basis of the text data.

The interpreter 313 transmits the interpretation result to the management program 33 (step S7). In doing so, the interpreter 313 may transmit the device ID for identifying the smart speaker 20 of the transmission source of the voice data to the cloud service apparatus 30 in association with the interpretation result.

The interpretation result converter 331 of the management program 33 converts the interpretation result acquired from the operation voice conversion program 31 into a job command of the MFP 10 (step S8). Table 1 below illustrates an example of the interpretation result and the job command converted from the interpretation result. The interpretation result converter 331 may store information corresponding to Table 1 in the memory 304 or the like of the cloud service apparatus 30 and refer to the information in order to convert an interpretation result into a job command.

TABLE 1

| Name | Value | Process in Voice Actions App |
|---|---|---|
| Action | COPY_EXECUTE | Execute copy job |
| | SCAN_EXECUTE | Execute scan job |
| | PRINT_EXECUTE | Execute print job |
| | FAX_EXECUTE | Execute FAX job |
| Parameter | Print side | Change setting value of print side |
| | Number of copies | Change setting value of number of copies |
| | * All parameters that can be specified as job setting values may be included | |

In the example of Table 1, "COPY_EXECUTE", "SCAN_EXECUTE", "PRINT_EXECUTE" and "FAX_EXECUTE" are illustrated as an example of intent (Intent). In addition, "print side", "number of copies", and the like are illustrated as an example of parameter (Parameter). The parameters include all parameters that can be specified as job setting values.

The interpretation result converter 331 of the management program 33 converts the interpretation result "COPY_EXECUTE" into an MFP 10 job command "execute copy job". Similarly, the interpretation result converter 331 converts the "SCAN_EXECUTE" into an MFP 10 job command "execute scan job". Similarly, the interpretation result converter 331 converts the interpretation result "PRINT_EXECUTE" to an MFP 10 job command "execute print job". Similarly, the interpretation result converter 331 converts the interpretation result "FAX_EXECUTE" into an MFP 10 job command "execute FAX job". While the basic jobs executed by the MFP 10 are described above, the jobs that can be interpreted by the cloud service apparatus 30 are not limited to the above jobs. For example, the jobs may include a job for collecting equipment information for a communication target and transmitting the collected information to the cloud service apparatus 30 and a job for displaying, predetermined information stored in the memory 304 of the communication target, on the display 307 of the communication target.

In addition, when the parameter of "print side" is included in the interpretation result, the interpretation result converter 331 of the management program 33 generates an MFP 10 job command for "change setting value of print side". Similarly, when the parameter of "number of copies" is included in the interpretation result, the interpretation result converter 331 generates an MFP 10 job command for "change setting value of number of copies".

That is, the interpretation result converter 331 of the management program 33 determines the intention of the user, for example, the type of job to be executed by the MFP 10, on the basis of the information included in the "Intent" of the interpretation result. In addition, the interpretation result converter 331 determines that the value included in "Parameter" is the setting value of the job, and converts the interpretation result into a job command.

The notifier 335 of the management program 33 transmits the job command generated in this manner to the MFP 10 (step S9). In this example, the notifier 335 transmits a job command "execute copy job (print side=double-sided)" to the MFP 10. The notifier 335 transmits the job command to the MFP 10 identified by the manager 336. In other words, the management program 33 can instruct, the MFP 10 identified by the apparatus ID linked with the device ID for identifying the smart speaker 20 of the transmission source of the voice data, to execute the job. As a result, the MFP 10 executes double-sided printing.

Details of Interpretation Operation in Cloud Service Apparatus 30

The memory 304 of the cloud service apparatus 30 stores dictionary information used for interpreting a job instructed by the user by voice input. The operation voice conversion program 31 generates an intent and a parameter on the basis of the dictionary information. More specifically, the operation voice conversion program 31 determines whether a word or the like included in the text data converted from the voice data matches the dictionary information. When the word or the like matches the dictionary information, the operation voice conversion program 31 generates an interpretation result including an intent and a parameter defined in the dictionary information. The dictionary information can be in any form as long as the intent and parameter can be generated with the dictionary information.

As an example, the dictionary information includes entity (Entity) information, intent (Intent) information, and association information. The entity information is for associating the parameters of a job with a natural language. In the entity information, multiple synonyms can be registered in one parameter. The intent information indicates the type of the job. The association information is for associating a user's utterance phase (natural language) with the entity information, and the user's utterance phase (natural language) with the intent information, respectively. The association information enables correct interpretation even if the order or nuance of the user's utterance slightly changes. In addition, a response text (interpretation result) may be generated on the basis of the input content with the use of the association information.

FIG. 9 is a diagram illustrating an example of the entity information. FIG. 9 is entity information corresponding to a print color (Print Color). In FIG. 9, the characters "Print Color" indicate the entity name. In addition, in FIG. 9, the characters such as "auto_color", "monochrome", "color", . . . in the left column indicate the parameter names. Moreover, in FIG. 9, the characters such as "auto_color", "monochrome, black and white", "color, full color", . . . in the right column indicate synonyms.

As can be seen from FIG. 9, as the entity information, parameters and synonyms are stored in association with each other. By registering synonyms together with parameters, when monochrome copy is instructed for example, a parameter can be set whether the user utters "Please copy by black and white" or "Please copy by monochrome".

FIGS. 10A to 10C are diagrams illustrating an example of the entity information registered on the basis of an utterance phrase. FIG. 10A is an example of utterance phrases of the user, FIG. 10B illustrates the intent name, and FIG. 10C illustrates the entity information. As illustrated in FIGS. 10A to 10C, the user operates the operation device 308 on a screen displayed on the display 307 of the cloud service apparatus 30, thereby dragging the user's utterance. Alternatively, the user operates the operation device 308 of the cloud service apparatus 30 on the screen displayed on the display of an apparatus that has accessed to a cloud service via the network 50, thereby dragging the user's utterance.

As a result, the entity information to be associated can be selected. In addition, if a value (VALUE) is set with the selected entity information, a parameter entered in the response is changed. For example, when the user utters "Please copy by black and white", and if the value is "$printColor", the return value is "printColor=monochrome". On the other hand, if the value is "$printColor.original", the return value is "printColor=blackandwhite". Here, if the value is "$printColor.original", the content of the user's utterance can be directly returned as the response parameter.

Interactive Operation

The voice operation system 1 according to the embodiment achieves an interactive system in which the voice operation system 1 responds to a voice input from a user. The voice operation system 1 according to the embodiment provides two types of responses as a response specific to the operation of the MFP 10, namely, an "insufficient input feedback" and an "input confirmation feedback", in addition to responding fixed phrases required for interaction, thereby achieving an interactive MFP operation system.

The "insufficient input feedback" is a response that is output when the information required to execute a job is not available. The "insufficient input feedback" is output when the input result of the user cannot be heard or when the required parameters are insufficient. In other words, for parameters other than the required parameters, it is not required to perform the insufficient input feedback even if they are not specified. Moreover, in addition to the parameters, a process to confirm a function to be used, such as a copy function or a scan function, may be included.

For example, a function for confirming with the user a function to be used and the parameter may be changed in accordance with the type of an external apparatus with which the cloud service apparatus 30 is connected for communication. In this case, the equipment information acquirer 333 may acquire information indicating the type and function of the external apparatus at a predetermined timing after the communication with the external apparatus is established, and for example, the voice feedbacker 213 may determine a function and a parameter to be confirmed with the user on the basis of the acquired information.

For example, when the type of the external apparatus is the MFP 10, the MFP 10 can confirm with the user the functions of the MFP 10, such as copy, print, scan, and FAX. Furthermore, the MFP 10 may confirm with the user which of the functions of the MFP 10, copy, print, scan, and FAX is to be used. In addition, the required parameters may be changed in accordance with the setting condition specified by the user. In other words, when the printing condition specified by the user is variable-size printing, the size of a paper to be printed is set as a required parameter. When the printing condition specified by the user is double-sided printing, the setting indicating whether the original is single-sided or double-sided is set as a required parameter. When the printing condition specified by the user is weekly magazine binding printing, the settings such as the finished size and the number of pages to be included in one page are set as required parameters.

The "input confirmation feedback" is a response that is output when the information required to execute the job is available. In other words, the input confirmation feedback is performed when all required parameters are specified. In addition, the input confirmation feedback is performed to prompt the user to execute a job with a current setting value or to change the setting value. In order to confirm with the user whether to execute the job with the current setting value, all the parameters specified by the user (regardless of whether they are required parameters or parameters other than the required parameters) can be output by voice.

Figure 11:
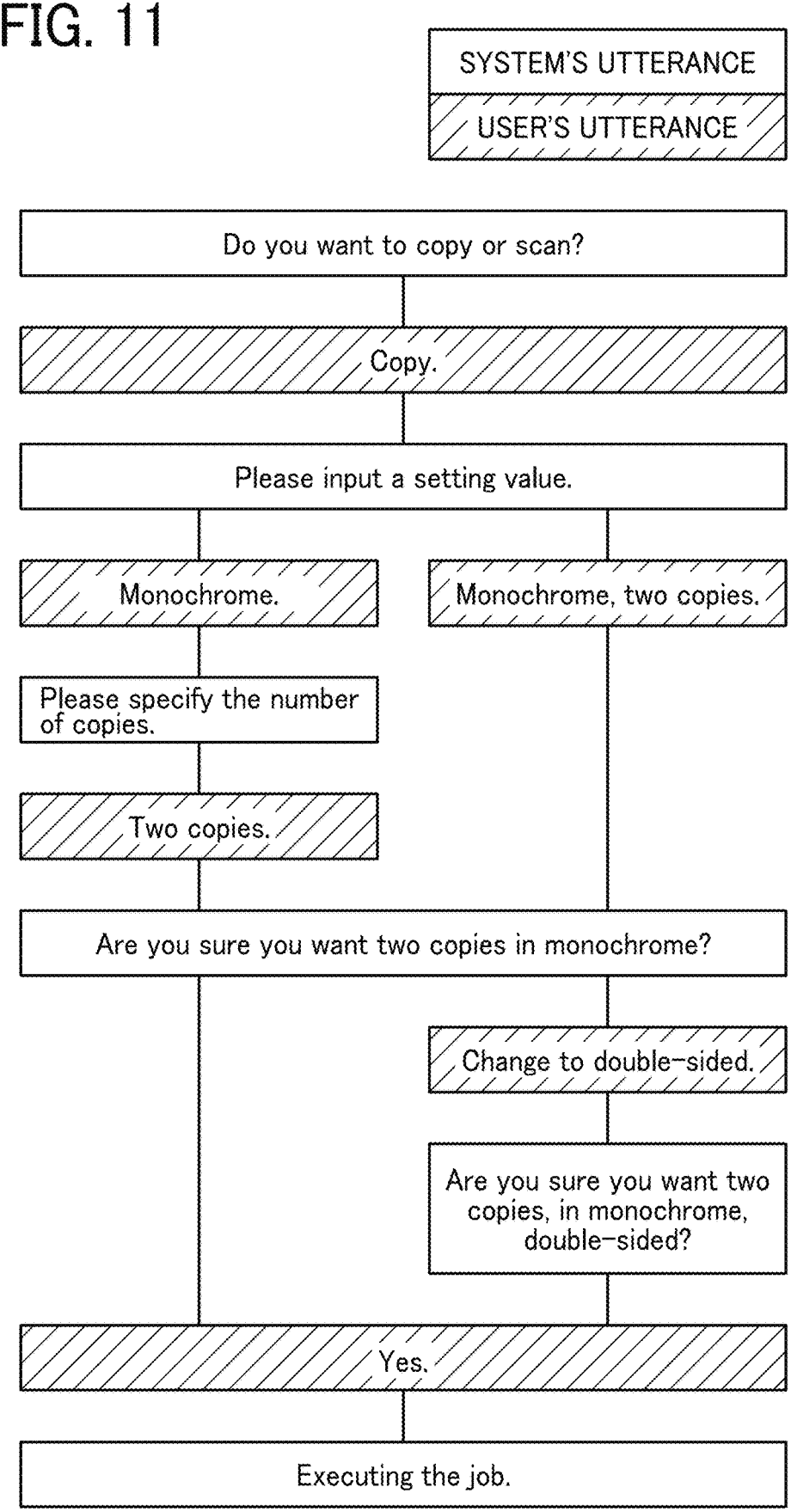
FIG. 11 is a diagram illustrating an example of the flow of an interactive voice operation.

FIG. 11 is a diagram illustrating an example of the flow of an interactive voice operation. FIG. 11 is an example of operating the MFP 10 so as to perform two copies of a monochrome image in double-sided. In this case, the number of copies (=2 copies) is a required parameter. The required parameter is not limited to the number of copies, and may include multiple parameters such as monochrome, a color, or a paper size.

Out of parameters, those which are required parameters may be stored in advance in the memory 304 of the cloud service apparatus 30. For example, the execution determiner 334 of the management program 33 determines whether the required parameters are fulfilled on the basis of the intent and parameters acquired from the operation voice conversion program 31. In addition, the user may operate the operation device 308 or access the cloud service apparatus 30 via the network 50, thereby appropriately changing which parameter is a required parameter.

In FIG. 11, the utterances indicated by diagonal lines indicate utterances of the user, and the utterances without diagonal lines indicate the utterances of the voice operation system 1. When the voice operation system 1 outputs by voice "Do you want to copy or scan?", the user utters "Copy" and instructs the use of the copy function. In order to request an input for a setting value of "Copy" specified by the user, the voice operation system 1 outputs by voice "Please input a setting value".

In response to this, it is assumed that the user utters "Monochrome". In this example, the number of copies is a required parameter as described above. Therefore, the voice operation system 1 requests an input for the number of copies, such as "Please specify the number of copies". This is an example of the "insufficient input feedback". For such "insufficient input feedback", the user specifies the number of copies, such as "Two copies". This eliminates the insufficient input, and the voice operation system 1 therefore responds, "Are you sure you want two copies in monochrome?" and thereby prompts the user to instruct to start copying. This is the "input confirmation feedback" that is output when the information required to execute the job is available.

The voice operation system 1 acquires information required to execute the job when the user responds, "Monochrome, two copies" to the voice output "Please input a setting value". Consequently, the voice operation system 1 performs the "input confirmation feedback" as described above, "Are you sure you want two copies in monochrome?"

When changing the copy mode from a single-sided copy to a double-sided copy, the user inputs by voice "Change to double-sided". In this case, the information required to execute the job is available, and thus the voice operation system 1 performs the "input confirmation feedback", "Are you sure you want two copies, in monochrome, double-sided?"

The user responds "Yes" to the "input confirmation feedback", such as "Are you sure you want two copies in monochrome?" or "Are you sure you want two copies, in monochrome, double-sided?" In this case, the voice operation system 1 responds "Executing the job" and executes the job specified by the user.

Flow of Interactive Operation

Figure 12:
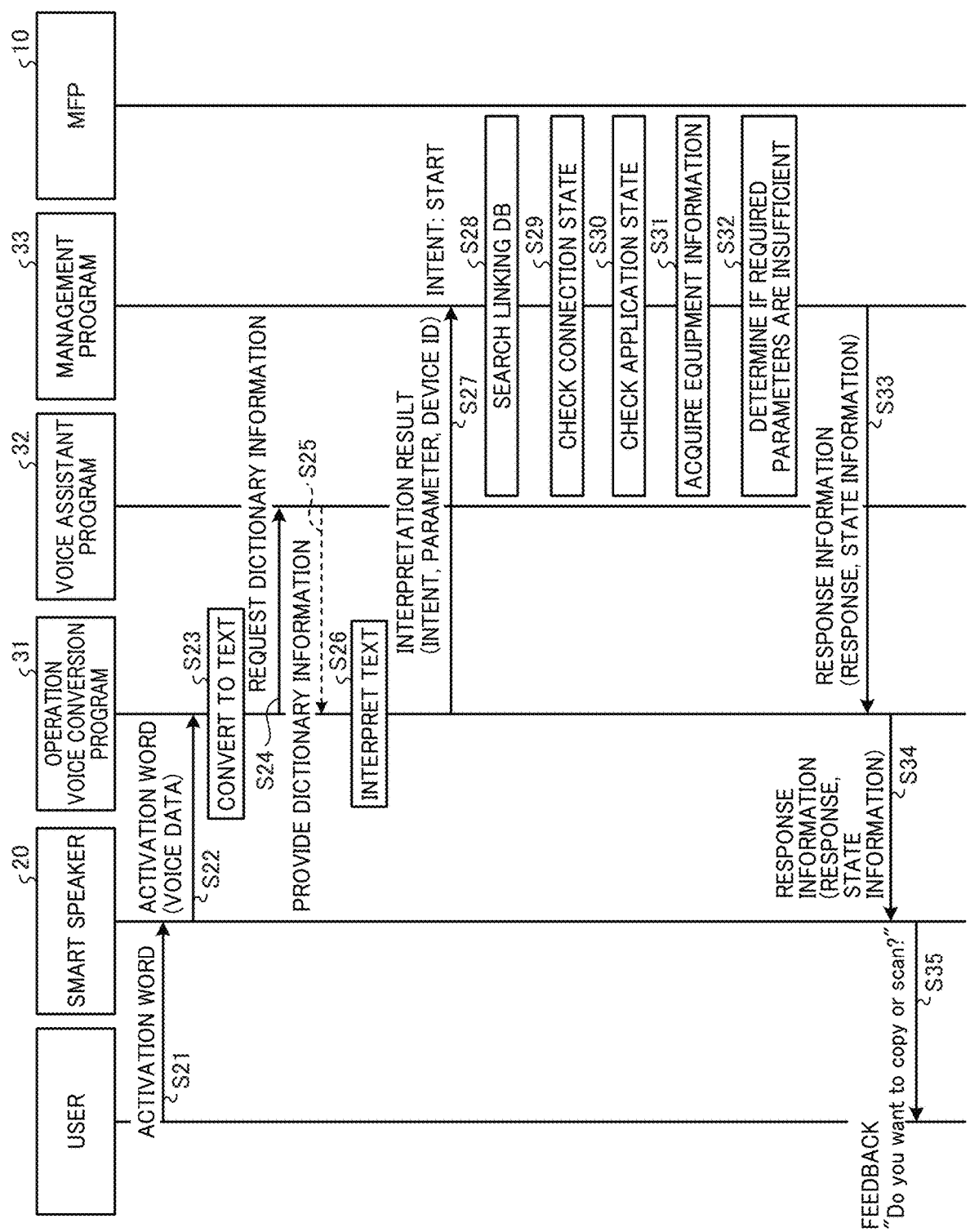
FIG. 12 is a sequence diagram illustrating an example of an activation process by a voice operation executed by the voice operation system according to the present embodiment.

FIG. 12 is a sequence diagram illustrating an example of an activation process by a voice operation executed by the voice operation system 1 according to the present embodiment.

After activating the operation voice processing program 21 of the smart speaker 20, the user instructs the activation of the voice assistant program 32 by, for example, voice input (step S21). For example, the user utters an activation word for activating the program.

The communication controller 212 of the smart speaker 20 transmits the activation word (voice data) to the cloud service apparatus 30 (step S22).

The text converter 312 of the operation voice conversion program 31 converts the activation word (voice data) into text data (step S23). The interpreter 313 of the operation voice conversion program 31 interprets the text data on the basis of the dictionary information provided from the voice assistant program 32 (steps S24 to S26).

The interpreter 313 transmits an interpretation result to the management program 33 (step S27). That is, the interpreter 313 transmits the intent, parameter, and device ID to the management program 33.

Prior to transmission of response information, the execution determiner 334 of the management program 33 searches the linking DB 35 for the MFP 10 corresponding to the acquired device ID (step S28). In doing so, if the MFP 10 linked with the device ID is not stored in the linking DB 35, the notifier 335 notifies the user that the smart speaker 20 is not linked with the communication target. For example, the execution determiner 334 generates response information including a response "This device is not linked with the equipment". Here, the execution determiner 334 may include, in the response, a method for linking the device with the communication target. Searching the linking DB 35 for the MFP 10 and generating the response information may be performed by any other timing at which the device ID is acquired.

The equipment information acquirer 333 checks the connection state indicating whether the communication connection with the MFP 10 is established (step S29).

Prior to transmission of the response information, the execution determiner 334 checks the state of an application for executing the function specified by the user for the communication target (step S30). The equipment information acquirer 333 acquires the equipment information or the execution determiner 334 refers to the equipment information acquired in advance by the equipment information acquirer 333. The execution determiner 334 thereby determines if the application is installed and if the application is ready to run.

For example, if the function instructed to execute is copy, if the application related to copy is not installed in the MFP 10 linked with the device ID, or if the application cannot be used because the application is running, or the like, the execution determiner 334 notifies the user. For example, the execution determiner 334 forms response information including a response "Application is not installed" or "Application is not currently available". Here, the execution determiner 334 may include a countermeasure method in the response. The check of the application state may be performed at any other timing at which the intent, parameter, and device ID are acquired from the operation voice conversion program 31.

In addition, prior to transmission of the response information, the equipment information acquirer 333 acquires the equipment information, or the execution determiner 334 reads out the equipment information acquired in advance by the equipment information acquirer 333, and the execution determiner 334 thereby acquires the equipment information (step S31). The acquired equipment information is used, for example, to determine whether the job type and job condition specified by the user are executable in the communication target.

The execution determiner 334 determines whether all the conditions required for a job execution are available on the basis of the intent and parameter (step S32). For example, the execution determiner 334 determines whether the required parameters are fulfilled. If the required parameters are not fulfilled, the execution determiner 334 transmits the response information to the operation voice conversion program 31 (step S33). In addition, the operation voice conversion program 31 transmits the response information to the smart speaker 20 (step S34).

Here, the response information can include text data, voice data, and image data. Here, as an example, the text data "Do you want to copy or scan?" is transmitted to the user. As long as the message prompts the user to input the job type or job setting condition, the content of the text data is not limited to this. In addition, if it is not possible to convert the text data into voice data with the smart speaker 20, the content may be transmitted as voice data.

The voice feedbacker 213 of the smart speaker 20 performs a voice feedback "Do you want to copy or scan?" (step S35). The smart speaker 20 may perform the feedback for the user not only by a voice output but also by displaying a text or image on the touch panel 207. In addition, if the job type and job setting condition are specified when instructing to activate the voice assistant program 32, the above steps may be omitted.

Figure 13B:
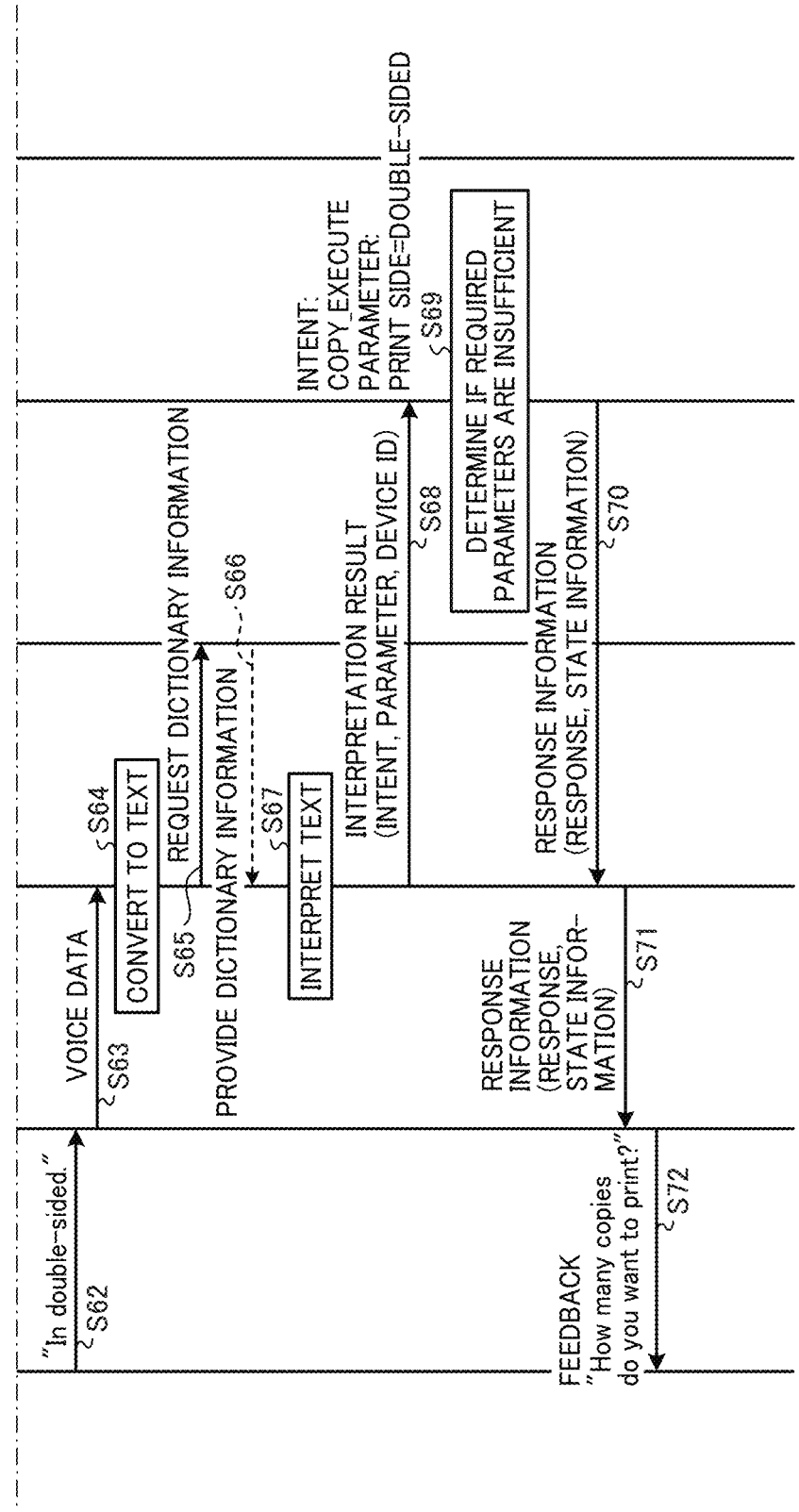

FIG. 13 is a sequence diagram illustrating an example of a copy setting process by a voice operation executed by the voice operation system 1 according to the present embodiment.

The user utters "Copy" (step S51). Alternatively, the user utters "Copy" when instructing to activate the voice assistant program 32. In doing so, the communication controller 212 of the smart speaker 20 transmits the voice data "Copy" to the cloud service apparatus 30 (step S52).

The text converter 312 of the operation voice conversion program 31 converts the voice data "Copy" into text data (step S53). The interpreter 313 of the operation voice conversion program 31 interprets the text data on the basis of the dictionary information provided from the voice assistant program 32 (steps S54 to S56).

Here, as described with reference to FIGS. 9 and 10, the interpreter 313 interprets the intent and parameter on the basis of the utterance phrase of the user indicated by the text data. Here, the intent "COPY_EXECUTE" is generated as the interpretation result and transmitted to the management program 33. In this example, since the user utters only "Copy", the number of copies is unknown (insufficient input). In addition, the interpreter 313 transmits the interpretation result to the management program 33 (step S57).

The execution determiner 334 of the management program 33 determines that the required parameters are not fulfilled on the basis of the interpretation result (step S58). Accordingly, the cloud service apparatus 30 inquires of the smart speaker 20 about the insufficient parameters.

The notifier 335 of the management program 33 transmits response information (Response) "Please input a setting value" to the smart speaker 20 via the operation voice conversion program 31 (steps S59 to S60).

Here, when transmitting the response information to the operation voice conversion program 31, the notifier 335 of the management program 33 may transmit state information indicating that a session is continuing. The state information indicates the state of the session. For example, if a job execution command has not been transmitted to an external apparatus yet and the user is continuing a job setting process, the notifier 335 transmits state information indicating that a session is continuing. On the other hand, when the transmission of the job execution command to the external apparatus has been completed, the notifier 335 transmits state information indicating that the session has ended.

However, the state information is not limited to this, and may include state information indicating the state of the session in more detail. The interpreter 313 of the operation voice conversion program 31 can determine whether to continue or end the session in accordance with the state information. In other words, if the session is ongoing, the operation voice conversion program 31 determines that job setting conditions divided into a plurality of utterances and specified by the user belongs to one job. In addition, when the session is completed, the operation voice conversion program 31 determines that a job setting condition included in the utterance of the user belong to a new job.

As a result, even if the instruction of a job type and a job setting condition extends over multiple utterances, the operation voice conversion program 31 can determine whether the instruction belongs to the same job or a different, new job. If the operation voice conversion program 31 does not receive a signal from the smart speaker 20 for a predetermined time or more, the operation voice conversion program 31 may determine that the session has ended. Even when the cloud service apparatus 30 manages the session, the MFP 10 that is a communication target may execute a job regardless of the session.

In this case, when acquiring a job execution command, the MFP 10 overwrites a job condition held by the MFP 10 with the job condition included in the job execution command. In doing so, the MFP 10 may delete all the job conditions held by the MFP 10 and reset the job condition to a default condition, and thereby set the job condition included in the job execution command. In addition, for a job condition that conflicts with the job condition held in the MFP 10, the MFP 10 prioritize the job condition included in the job execution command and overwrites the job condition held in the MFP, and for a job condition that does not conflict with the job condition held in the MFP 10, the job condition held in advance by the communication target may be maintained. When a job is executed, the MFP 10 can delete the job condition included in the job execution command and reset the MFP 10 to a default state registered in advance.

The voice feedbacker 213 of the smart speaker 20 outputs by voice "Please input a setting value" via the speaker 208, and displays a text "Please input a setting value" on the touch panel 207 (step S61). Either the voice output or the text display on the touch panel 207 may be omitted.

Next, since there is an insufficient input feedback, the user utters, for example, "In double-sided" (step S62). The communication controller 212 of the smart speaker 20 transmits the voice data "In double-sided" to the cloud service apparatus 30 (step S63).

The text converter 312 of the operation voice conversion program 31 converts the voice data "In double-sided" into text data (step S64). The interpreter 313 of the operation voice conversion program 31 interprets the text data on the basis of the dictionary information provided from the voice assistant program 32 (steps S65 to S67). Here, a parameter "print side=double-sided" is generated as the interpretation result. Then, the interpreter 313 transmits the intent "COPY_EXECUTE" and the parameter "print side=double-sided" to the management program 33 together with the intent and parameter included in the previous utterance (step S68).

The execution determiner 334 determines whether the parameter acquired from the smart speaker 20 includes all the set required parameters (step S69). In this example, since the user utters only "Copy" and "In double-sided", the number of copies is unknown (required parameters are insufficient). While a case has been described where the operation voice conversion program 31 combines the interpretation result of the previous utterance and the interpretation result of the current utterance to generate the intent and parameter, the present invention is not limited to this. That is, the management program 33 may store the interpretation result of the previous utterance and combine the interpretation result of the previous utterance with the interpretation result of the current utterance to generate the intent and parameter. In this case, the interpreter 313 may transmit only the parameter "print side=double-sided" newly acquired in the current utterance to the management program 33.

Which of multiple parameters is a required parameter can be stored in advance in the memory 304 of the cloud service apparatus 30. In this case, the execution determiner 334 determines whether the parameter acquired from the smart speaker 20 includes all the set required parameters on the basis of the information of the required parameters stored in the memory 304. If the required parameters have not been set, the execution determiner 334 prompts the user via the smart speaker 20 to set the required parameters.

Consequently, the notifier 335 of the management program 33 transmits response information (Response) "How many copies do you want to print?" to the smart speaker 20 via the operation voice conversion program 31 (steps S70 to S71).

The voice feedbacker 213 of the smart speaker 20 outputs by voice "How many copies do you want to print?" via the speaker 208, and displays a text "How many copies do you want to print?" on the touch panel 207 (step S72).

Figure 14:
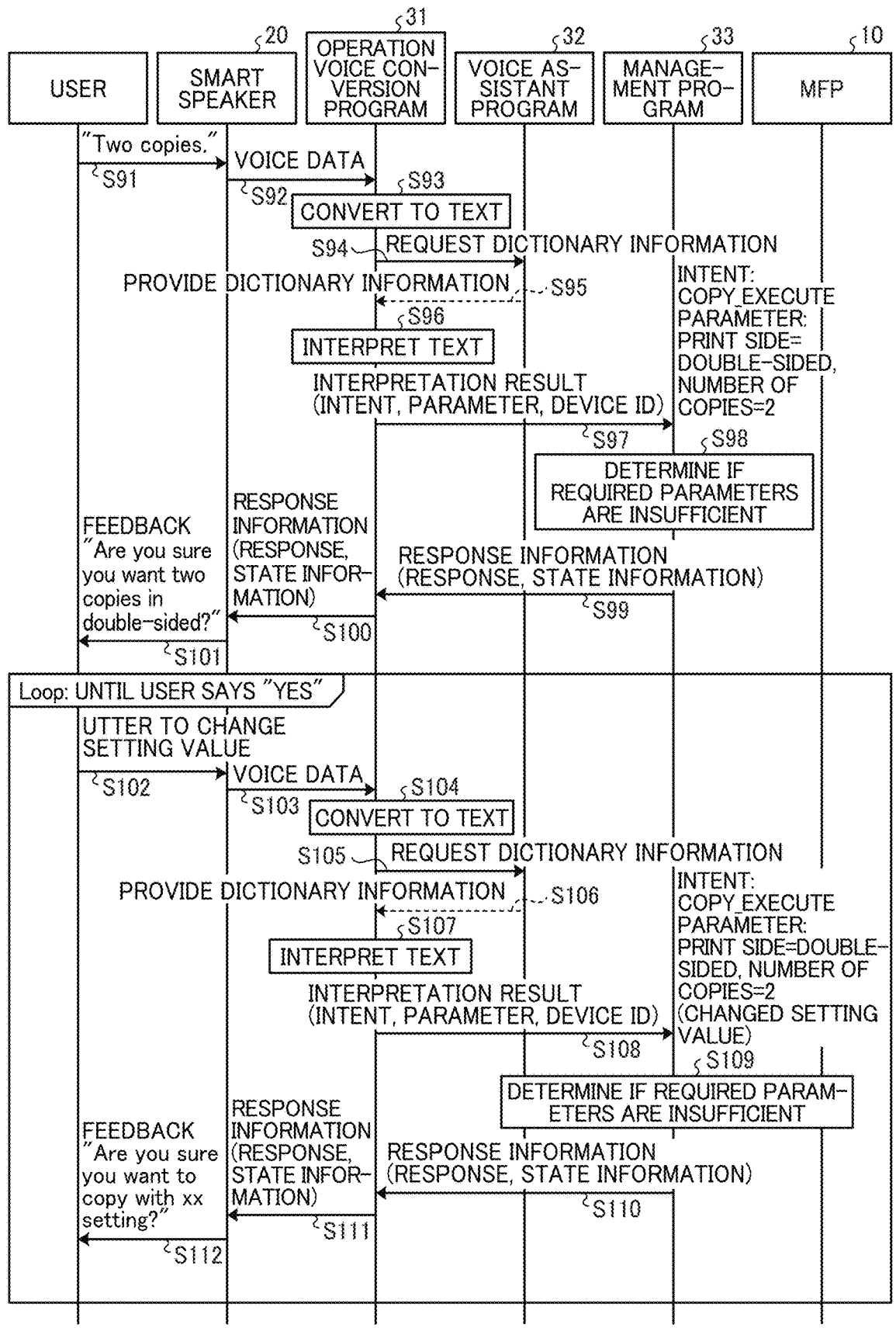
FIG. 14 is a sequence diagram illustrating an example of a number of copies setting process by a voice operation executed by the voice operation system according to the present embodiment.

FIG. 14 is a sequence diagram illustrating an example of a number of copies setting process by a voice operation executed by the voice operation system 1 according to the present embodiment.

Since there is an insufficient input feedback again, the user utters, for example, "Two copies" (step S91). The communication controller 212 of the smart speaker 20 transmits the voice data "Two copies" to the cloud service apparatus 30 (step S92).

The text converter 312 of the operation voice conversion program 31 converts the voice data "Two copies" into text data (step S93). The interpreter 313 of the operation voice conversion program 31 interprets the text data on the basis of the dictionary information provided from the voice assistant program 32 (steps S94 to S96).

Here, the interpreter 313 generates a parameter "number of copies=2" as the interpretation result. The interpreter 313 transmits the intent "COPY_EXECUTE" and the parameter "print side=double-sided, number of copies=2" to the management program 33 together with the intent and parameter included in the previous utterance (step S97).

The execution determiner 334 determines whether the parameter acquired from the smart speaker 20 includes all the set required parameters (step S98). In this case, the user transmits the voice data "Two copies", thereby eliminating the insufficient required parameters for the copy job.

Consequently, the notifier 335 of the management program 33 transmits response information "Are you sure you want two copies in double-sided?" to the smart speaker 20 via the operation voice conversion program 31 (steps S99 to S100).

The voice feedbacker 213 of the smart speaker 20 outputs voice on the basis of the Response included in the response information because the insufficient required parameter is eliminated and the copy is ready to start (step S101). For example, the voice feedbacker 213 outputs the text of the input confirmation feedback by voice "Are you sure you want two copies in double-sided?"

Here, the smart speaker 20 may read all or some of the text data stored in the memory 204 and combine the text data to generate data, instead of outputting the text data and voice data included in the response information. In response to this input confirmation feedback, the user makes a voice input to instruct changing a setting value or starting a copy.

Here, steps S102 to S112 illustrate the flow of operation when a changing a setting value is instructed by voice.

The user utters to change a setting value (step S102). The communication controller 212 of the smart speaker 20 transmits voice data to the cloud service apparatus 30 (step S103). The text converter 312 of the operation voice conversion program 31 converts the voice data for changing the setting value into text data (step S104). The interpreter 313 of the operation voice conversion program 31 interprets the text data on the basis of the dictionary information provided from the voice assistant program 32 (steps S105 to S107). The interpreter 313 transmits the interpretation result to the management program 33 (step S108).

The execution determiner 334 determines whether the parameter acquired from the smart speaker 20 includes all the set required parameters (step S109). Then, the notifier 335 of the management program 33 transmits the response information corresponding to the determination result to the smart speaker 20 via the operation voice conversion program 31 (steps S110 to S111).

The voice feedbacker 213 of the smart speaker 20 performs a voice feedback, for example, "Are you sure you want to copy with XX setting?" on the basis of the Response included in the response information (step S112).

Figure 15:
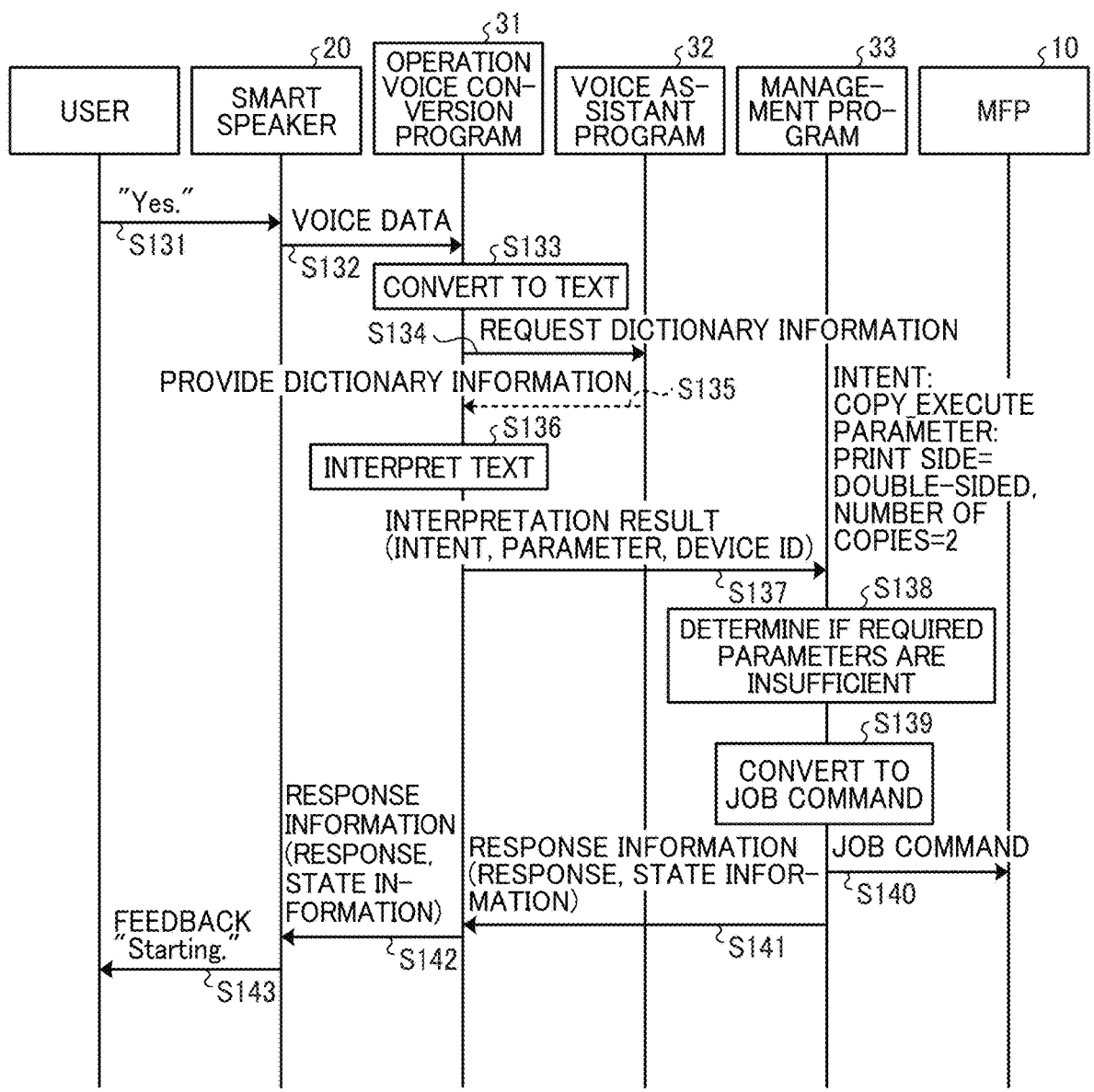
FIG. 15 is a sequence diagram illustrating an example of a confirmation process by a voice operation executed by the voice operation system according to the present embodiment.

The steps S131 to S143 in the sequence diagram in FIG. 15 are the flow of the operation of each component when instructing the start of copy. The user responds "Yes" by the input confirmation feedback described above (step S131). The communication controller 212 of the smart speaker 20 transmits voice data to the cloud service apparatus 30 (step S132).

The text converter 312 of the operation voice conversion program 31 converts the voice data to text data (step S133).

The interpreter 313 of the operation voice conversion program 31 interprets the text data on the basis of the dictionary information provided from the voice assistant program 32 (steps S134 to S136). Here, when recognizing a copy start instruction, the interpreter 313 generates an interpretation result in which the parameters "print side=double-sided" and "number of copies=2" are added to the intent "COPY_EXECUTE".

The interpreter 313 transmits the interpretation result to the management program 33 (step S137). However, if the execution determiner 334 of the management program 33 determines that the interpretation result fulfills the required parameters, the input confirmation feedback may be omitted.

The execution determiner 334 of the management program 33 determines whether the interpretation result fulfills the required parameters (step S138). When determining that the interpretation result fulfills the required parameters, the interpretation result converter 331 converts the interpretation result into an MFP 10 job command (step S139). Then, the execution instructor 332 transmits the converted job command to the MFP 10 (step S140). As a result, the MFP 10 executes copy by voice operation.

The notifier 335 of the management program 33 transmits, response information indicating that the execution of the job has been started by the job command, to the smart speaker 20 via the operation voice conversion program 31 (steps S141 to S142).

The voice feedbacker 213 of the smart speaker 20 performs a voice feedback, for example, "Starting" on the basis of the Response included in the response information (step S143).

Example of Information Fed Back from Cloud Service Apparatus 30

Figure 16:
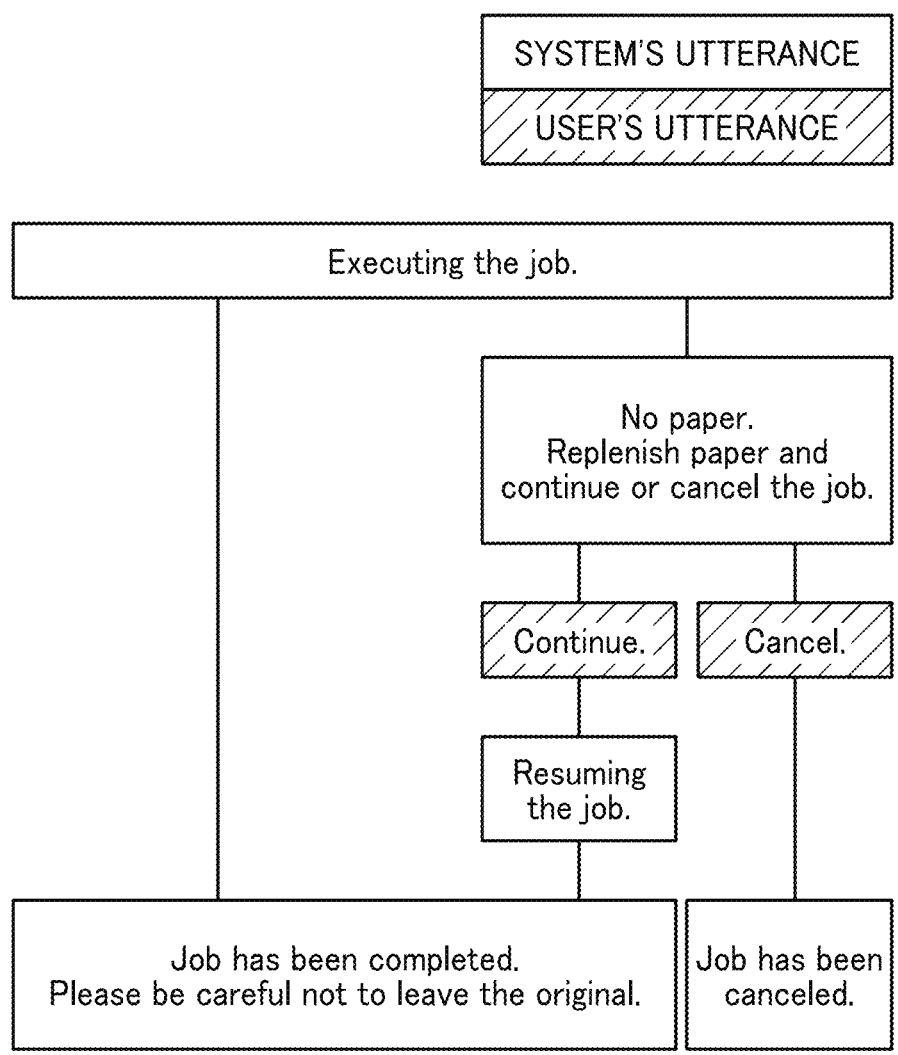
FIG. 16 is a diagram illustrating the flow of an interactive voice operation when an error occurs.

FIG. 16 is a diagram illustrating the flow of an interactive voice operation when an error occurs. In the above description, a case where the voice feedbacker 213 of the smart speaker 20 outputs the text data and voice data included in the response information has been described. However, the voice feedbacker 213 is not limited to these, and may read out, on the basis of the information included in the response information, all or some of the text data stored in the memory 204 of the smart speaker 20 and combine the text data to generate data. Table 2 below illustrates an example of response information and feedback that are fed back from the cloud service apparatus 30 to the smart speaker 20.

TABLE 2

| Name | Value | Process in Voice Actions App |
|---|---|---|
| Action | COPY_PARAMETER_SETTING | Prompt for input of job setting value |
|  | COPY_CONFIRM | Prompt for confirmation of job setting value |
|  | COPY_EXECUTE | Execute print job |
| Parameter | Print side | Change setting value of print side |
|  | Number of copies | Change setting value of number of copies |
|  | * All parameters that can be specified as job setting values may be included |  |
| Response | Text | Give feedback to user on content specified in text |

As illustrated in this Table 2, the intent such as "COPY_PARAMETER_SETTING" for prompting the user to input a job setting value and "COPY_CONFIRM" for prompting the user to confirm the job setting value are included in the response information, and is fed back from the cloud service apparatus 30 to the smart speaker 20.

The voice feedbacker 213 of the smart speaker 20 determines the feedback to the user in accordance with the intent, parameter, and response included in the response information. The voice feedbacker 213 may be configured to store the information corresponding to Table 2 in the memory 204 of the smart speaker 20 and to refer to the information in order to determine the content of the feedback. While, in Table 2, the case of copy has been described as an example, "PARAMETER_SETTING" for prompting the user to input a job setting value and "CONFIRM" for prompting the user to confirm the job setting value may be used as the intent for print, scan, and FAX as well similarly with Table 2. The response information is required to include at least either the intent and parameter or the response.

In addition, the cloud service apparatus 30 includes, for example, parameters such as the setting value of print side such as double-sided or single-sided, and the number of copies, in the response information and feeds back the response information to the smart speaker 20. Moreover, when the required parameters are insufficient, the cloud service apparatus 30 includes a message for prompting the input of an insufficient parameter in a signal as a response and feeds back the signal to the smart speaker 20.

Interaction when Job Execution is Operated and when Error Occurs

Figure 17:
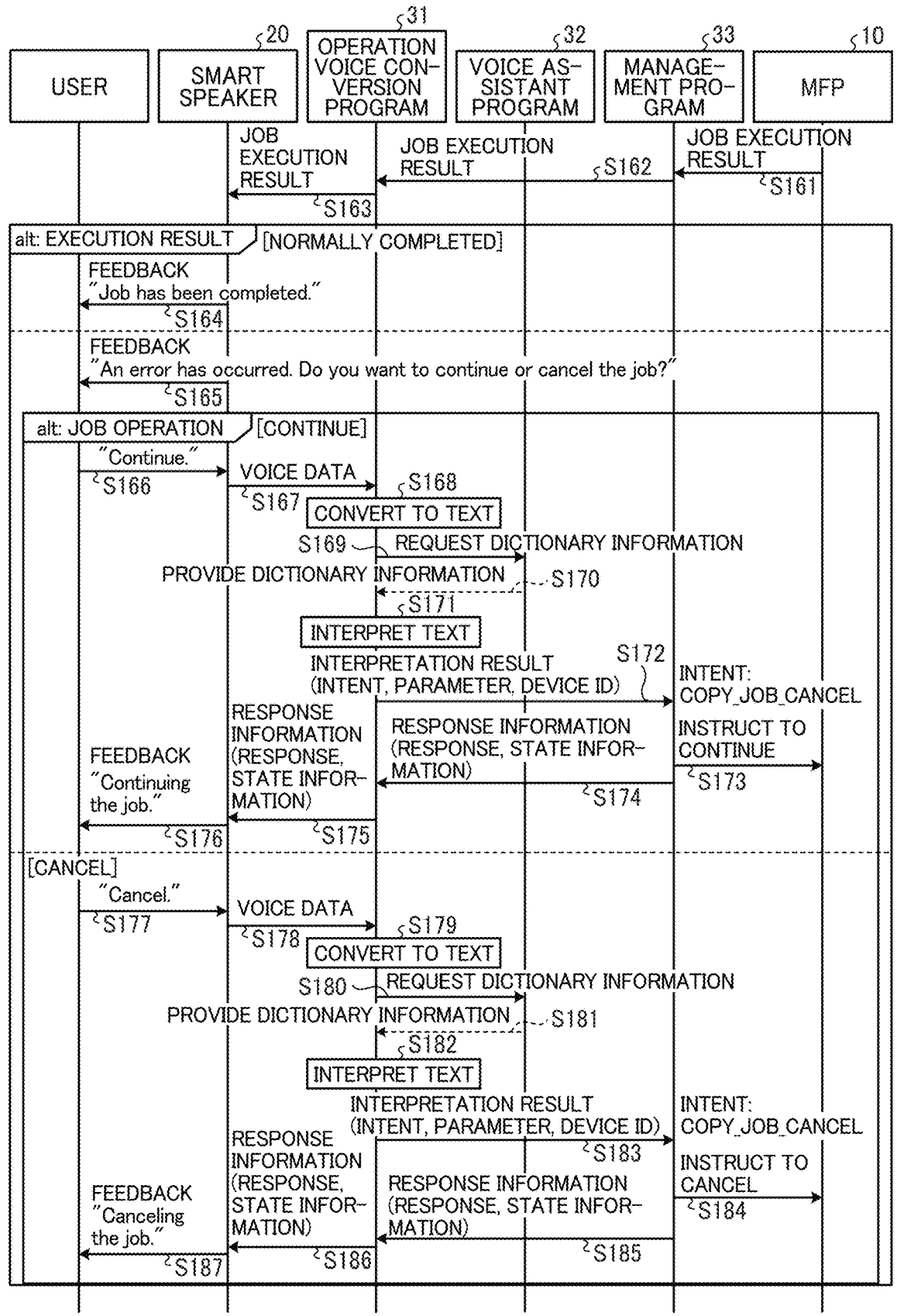
FIG. 17 is a sequence diagram illustrating an example of a confirmation process by a voice operation executed by the voice operation system according to the present embodiment.

Next, FIG. 17 illustrates an example of an interaction when the user responds "Yes" by the input confirmation feedback described above such as "Are you sure you want to execute the job?", and the job is thereby executed or when an error occurs.

First, the user responds "Yes" by the input confirmation feedback described above such as "Executing the job", and the job is thereby executed in the MFP 10. If the job is completed without any problem, for example, a completion message (voice and text) such as "The job has been completed. Please be careful not to leave the original" is output via the smart speaker 20.

On the other hand, if a paper shortage error occurs, a job confirmation feedback such as "No paper. Replenish paper and continue or cancel the job" is performed via the smart speaker 20. In response to this confirmation feedback, when the user replenishes the MFP 10 with paper and responds by uttering "Continue", the MFP 10 is instructed to continue the job, and the MFP 10 resumes the job. In response to this, if the user instructs the job cancellation by uttering "Cancel" by the confirmation feedback, the job cancellation is notified to the MFP 10, and the job after the error occurrence is canceled. Then, a confirmation feedback outputting a voice and a text such as "Job has been canceled" is performed via the smart speaker 20.

Flow of Interaction Operation when Job Execution is Operated and when Error Occurs FIG. 17 is a sequence diagram illustrating an example of a confirmation process by a voice operation executed by the voice operation system 1 according to the present embodiment.

The MFP 10 executes a specified job and thereby transmits an execution result indicating that the job has been normally completed or an execution result indicating that an error has occurred, to the management program 33 of the cloud service apparatus 30 (step S161). The management program 33 transmits the execution result to the operation voice conversion program 31 (step S162). In addition, the operation voice conversion program 31 transmits the execution result to the smart speaker 20 (step S163).

When receiving the execution result indicating that the job has been normally completed, the voice feedbacker 213 of the smart speaker 20 outputs a voice message such as "Job has been completed" (step S164).

On the other hand, when receiving the execution result indicating that an error has occurred, the voice feedbacker 213 of the smart speaker 20 outputs a voice message such as "An error has occurred. Do you want to continue or cancel the job?" asking if the job should be continued (step S165).

Specifically, the MFP 10 transmits a completion notification to the management program 33 when the job is completed. In addition, when an error occurs, the MFP 10 transmits error information regarding the error such as the error content to the management program 33. Moreover, the management program 33 generates response information including a message such as "Job has been completed" or "An error has occurred. Do you want to continue or cancel the job?", as response information in accordance with the information acquired from the MFP 10. Then, the management program 33 transmits the generated response information to the smart speaker 20 via the operation voice conversion program 31.

Steps S166 to S176 in FIG. 17 are the flow of operation of each component when the user specifies continuation. That is, in response to the inquiry "An error has occurred. Do you want to continue or cancel the job?", the user removes the cause of the error and then utters "Continue" (step S166). In this case, the communication controller 212 of the smart speaker transmits the voice data "Continue" to the cloud service apparatus 30 (step S167).

The text converter 312 of the operation voice conversion program 31 converts the voice data "Continue" into text data (step S168). The interpreter 313 of the operation voice conversion program 31 interprets the intent and parameter represented in the utterance phrase of the user indicated by the text data, on the basis of the dictionary information provided from the voice assistant program 32 (steps S169 to S171).

The interpreter 313 of the operation voice conversion program 31 generates an interpretation result in which the intent is "COPY_JOB_CONTINUE", and transmits the interpretation result to the management program 33 (step S172). The execution instructor 332 of the management program 33 instructs the MFP 10 to continue the job (step S173).

Moreover, the notifier 335 of the management program 33 transmits, response information in which a response "Continuing the job" is set, to the smart speaker 20 via the operation voice conversion program 31 (steps S174 to S175). In addition, the voice feedbacker 213 of the smart speaker 20 performs an input confirmation feedback "Continuing the job" (step S176).

On the other hand, steps S177 to S187 in FIG. 17 are the flow of operation of each component when the user specifies a job cancel. That is, in response to the inquiry "An error has occurred. Do you want to continue or cancel the job?", the user utters "Cancel" (step S177). In this case, the communication controller 212 of the smart speaker 20 transmits the voice data "Cancel" to the cloud service apparatus 30 (step S178).

The text converter 312 of the operation voice conversion program 31 converts the voice data "Cancel" into text data (step S179). The interpreter 313 of the operation voice conversion program 31 interprets the text data on the basis of the dictionary information provided from the voice assistant program 32 (steps S180 to S182). Then, the operation voice conversion program 31 transmits the interpretation result in which the intent is "COPY_JOB_CANCEL" to the management program 33 (step S183).

The execution instructor 332 of the management program 33 instructs the MFP 10 to cancel a job (step S184). The notifier 335 of the management program 33 transmits, response information in which a response "Canceling a job" is set, to the smart speaker 20 via the operation voice conversion program 31 (steps S185 to S186).

In addition, the voice feedbacker 213 of the smart speaker 20 performs an input confirmation feedback "Canceling a job" (step S187).

Figure 18:
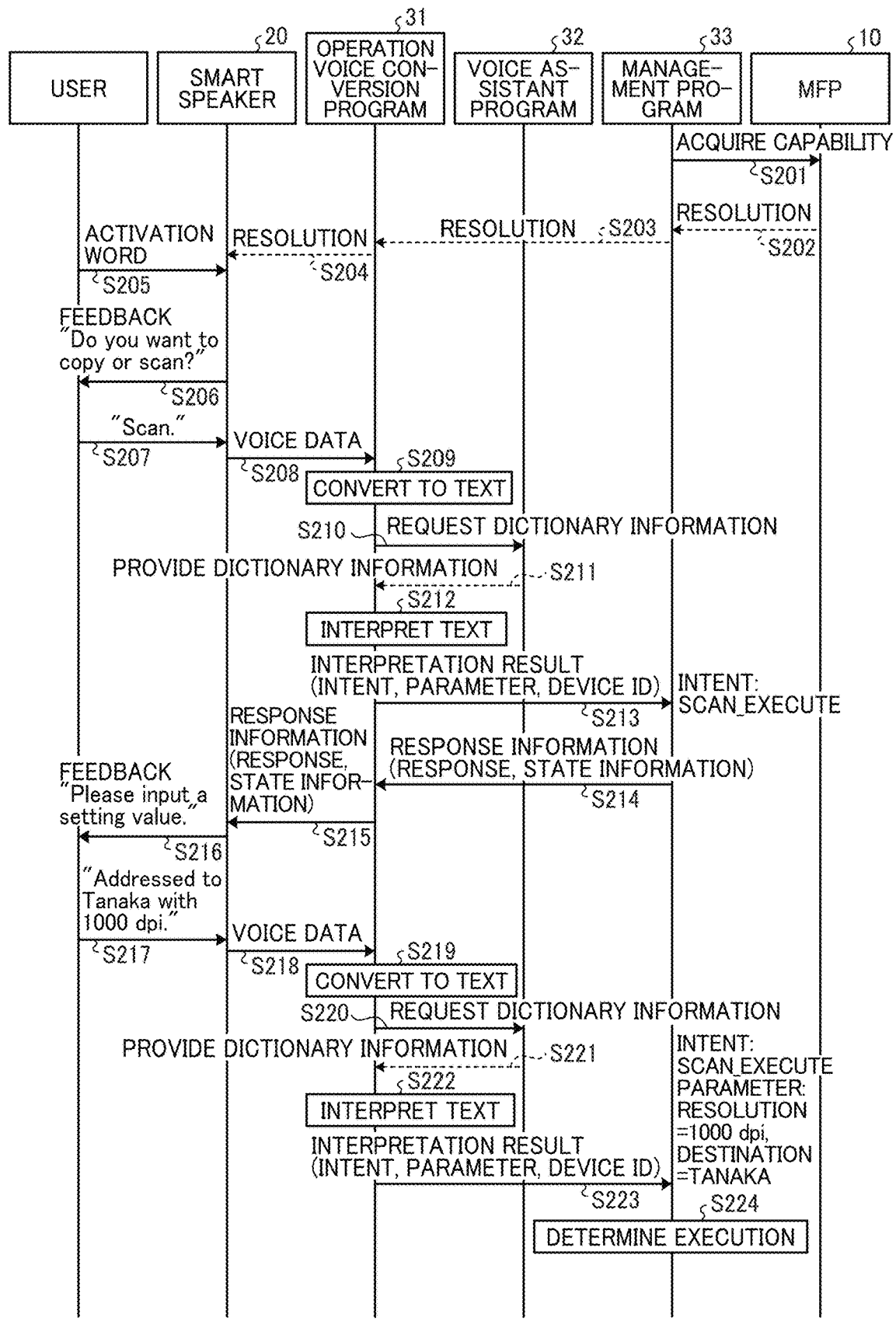
FIG. 18 is a sequence diagram illustrating an example of an execution determination process by a voice operation executed by the voice operation system according to the present embodiment.

Parameter Adjustment Operation According to MFP 10's Equipment Capability Through Interaction Next, the voice operation system 1 of the embodiment implements execution of a job corresponding to the equipment capability of the MFP 10 by an interactive operation. FIG. 18 is a sequence diagram illustrating an example of an execution determination process by a voice operation executed by the voice operation system 1 according to the present embodiment.

The equipment information acquirer 333 of the management program 33 inquires the MFP 10 about, for example, a processable resolution (step S201). That is, the equipment information acquirer 333 acquires Capability.

In response to this inquiry, the MFP 10 replies to the management program 33 a processable resolution such as "200 dpi to 600 dpi" (step S202).

The notifier 335 of the management program 33 transmits the resolution information to the smart speaker 20 via the operation voice conversion program 31 (steps S203 to step S204). As a result, the smart speaker 20 recognizes the resolution that can be processed by the MFP 10.

The equipment information acquirer 333 may acquire information on the processing capability in advance at any timing after the communication between the cloud service apparatus 30 and the MFP 10 is established. For example, the equipment information acquirer 333 may acquire the information on the processing capability when the MFP 10 is registered in the management DB 34, may acquire the information on the processing capability on a regular basis, or may acquire the information on the processing capability at a timing at which the activation of the voice assistant program 32 is accepted from the smart speaker 20 or a timing at which a job command is accepted from the smart speaker 20. The acquired processing capability information can be stored in the memory 304 included in the cloud service apparatus 30, and may be stored in link with the MFP 10 in the management DB 34, for example. In addition, the acquisition of the processing capability may be performed by another program, and the equipment information acquirer 333 may acquire the information acquired by the other program, thereby indirectly acquiring the information held by the MFP 10.

Moreover, the processing capability acquired by the equipment information acquirer 333 from the MFP 10 is not limited to the resolution information. The equipment information acquirer 333 acquires, for example, information on the types of jobs that can be executed by the MFP 10 and job setting conditions, such as a type and a version of an application installed in the MFP 10, a printing speed, a file format that can be processed, a connection state of optional equipment including a finisher.

After activating the operation voice conversion program 31 of the smart speaker 20, the user instructs the activation of the voice assistant program 32 by, for example, voice input (step S205). As a result, processes same as the processes from steps S21 to step S35 illustrated in FIG. 12 are performed.

The voice feedbacker 213 of the smart speaker 20 performs a voice feedback that prompts a job instruction such as "Do you want to copy or scan?" (step S206). In response to this, the user utters "Scan" (step S207). The communication controller 212 of the smart speaker 20 transmits the voice data to the cloud service apparatus 30 (step S208).

The text converter 312 of the operation voice conversion program 31 converts the voice data into text data (step S209). The interpreter 313 of the operation voice conversion program 31 interprets the text data on the basis of the dictionary information provided from the voice assistant program 32 (steps S210 to S212). Then, the interpreter 313 transmits the interpretation result in which the intent is "SCAN_EXECUTE" to the management program 33 (step S213).

The required parameters are insufficient with only the scan instruction, and therefore the notifier 335 of the management program 33 transmits, response information in which a response "Please input a setting value" is set, to the smart speaker 20 via the operation voice conversion program 31 (steps S214 to S215).

In addition, the voice feedbacker 213 of the smart speaker 20 performs an insufficient input feedback "Please input a setting value" (step S216).

Next, for such insufficient input feedback, the user utters "Addressed to Tanaka with 1000 dpi" (step S217). The communication controller 212 of the smart speaker 20 transmits the voice data to the cloud service apparatus 30 (step S218).

The text converter 312 of the operation voice conversion program 31 converts the voice data into text data (step S219). The interpreter 313 of the operation voice conversion program 31 interprets the text data on the basis of the dictionary information provided from the voice assistant program 32 (steps S220 to S222). Then, the interpreter 313 transmits the interpretation result in which the intent is "SCAN_EXECUTE" and the parameter is "resolution=1000 dpi, destination=Tanaka" to the management program 33 (step S223).

The execution determiner 334 of the management program 33 determines whether the job specified by the user can be executed by the MFP 10 on the basis of the parameter included in the interpretation result (step S224). The execution determiner 334 acquires the equipment information by the equipment information acquirer 333 or refers to the equipment information acquired in advance by the equipment information acquirer 333, thereby determining whether the job can be executed in the communication target with the setting specified by the user.

Figure 19:
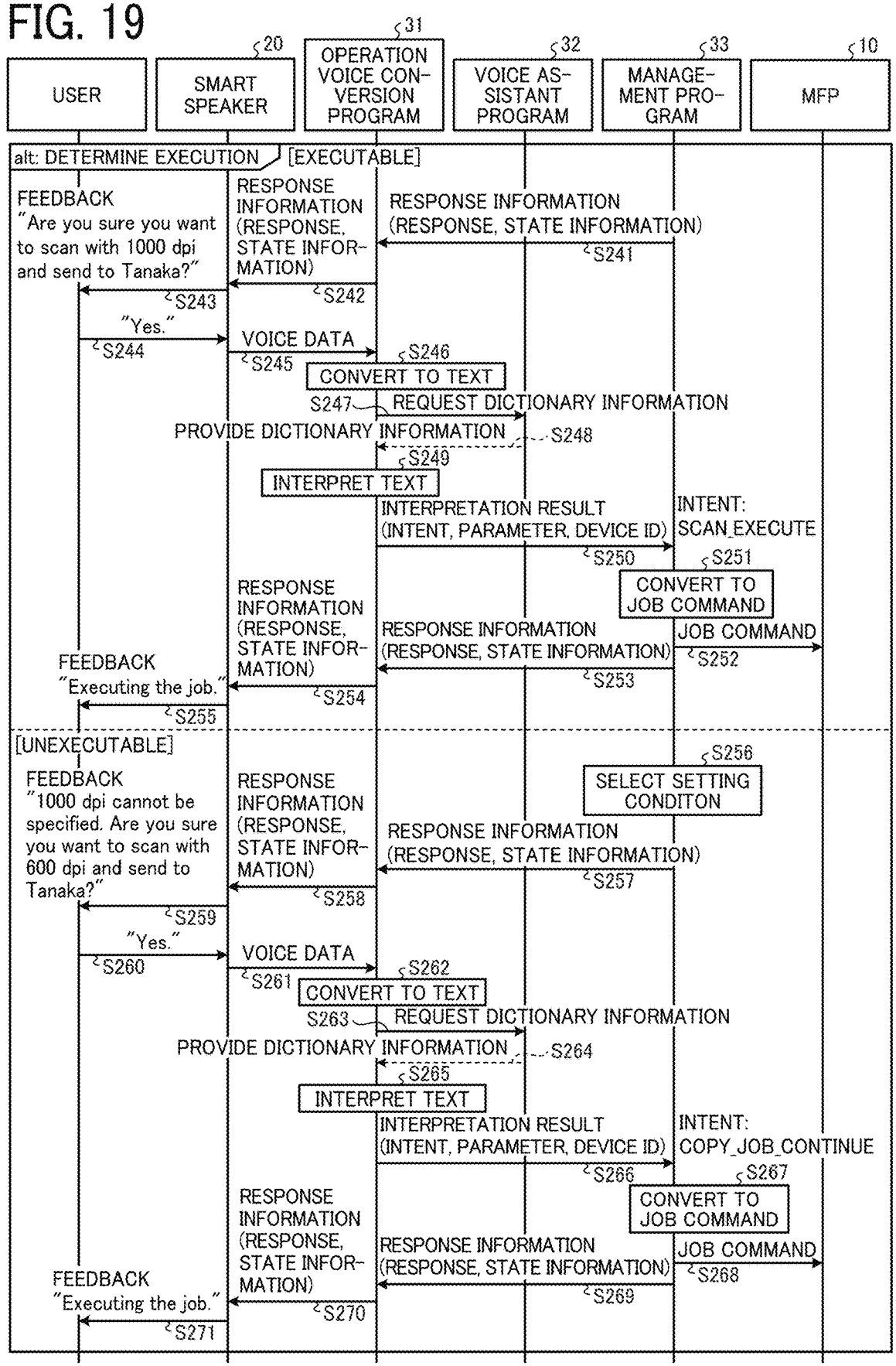
FIG. 19 is a sequence diagram illustrating an example of processes for determining the propriety of execution through a voice operation, which processes are executed by the voice operation system according to the present embodiment.

FIG. 19 is a sequence diagram illustrating an example of processes for determining the propriety of execution through a voice operation, which processes are executed by the voice operation system 1 according to the present embodiment.

If the MFP 10 can perform image processing at a resolution of 1000 dpi, the notifier 335 of the management program 33 transmits the response information to the smart speaker via the operation voice conversion program 31 (steps S241 to S242). The response information includes a response "Are you sure you want to scan with 1000 dpi and send to Tanaka?"

The voice feedbacker 213 of the smart speaker 20 performs an input confirmation feedback "Are you sure you want to scan with 1000 dpi and send to Tanaka?" (step S243).

In response to this input confirmation feedback, the user utters "Yes" (step S244). The communication controller 212 of the smart speaker 20 transmits the voice data to the cloud service apparatus 30 (step S245).

The text converter 312 of the operation voice conversion program 31 converts the voice data into text data (step S246). The interpreter 313 of the operation voice conversion program 31 interprets the text data on the basis of the dictionary information provided from the voice assistant program 32 (steps S247 to S249). Then, the interpreter 313 transmits the interpretation result in which the intent is "SCAN_EXECUTE" and the parameter is "resolution=1000 dpi, destination=Tanaka" to the management program 33 (step S250).

The interpretation result converter 331 of the management program 33 converts the interpretation result into a job command (step S251). The execution instructor 332 of the management program 33 transmits the job command to the MFP 10 (step S252).

Moreover, the management program 33 transmits, response information in which a response "Executing the job" is set, to the smart speaker 20 via the operation voice conversion program 31 (steps S253 to S254).

Furthermore, the voice feedbacker 213 of the smart speaker 20 performs an input confirmation feedback "Executing the job" (step S255).

On the other hand, if 600 dpi is the limit of the processing capability of the MFP 10, it is difficult for the MFP 10 to execute the image processing of 1000 dpi specified by the user. In this case, the execution determiner 334 selects a function or a value closest to the function or the processing capability value specified by the user within the range of the processing capability of the MFP 10 (step S256).

For example, if the resolution that can be processed by the MFP 10 is in the range of 200 to 600 dpi, the execution determiner 334 selects the 600 dpi closest to the 1000 dpi specified by the user. In other words, if determining that the job cannot be executed with the intent and parameter included in the interpretation result on the basis of the equipment information or equipment state, the execution determiner 334 selects a setting condition with which a job can be executed by the MFP 10 with reference to the processing capability of the MFP 10. Then, the execution determiner 334 generates response information on the basis of the selected setting condition.

Here, the management program 33 can acquire the device ID for identifying the smart speaker 20 of the voice input source in addition to the interpretation result from the operation voice conversion program 31. Consequently, the execution determiner 334 can identify the MFP 10 linked with the device ID acquired with reference to the linking DB 35 and refer to the identified processing capability of the MFP 10, thereby determining whether to execute the job. In addition, when the user instructs to execute a function not included in the MFP 10 in the first place, the execution determiner 334 generates response information indicating that the job cannot be executed.

The notifier 335 of the management program 33 transmits the generated response information to the smart speaker 20 via the operation voice conversion program 31 (steps S257 to S258). The management program 33 may transmit information on the selected setting condition to the operation voice conversion program 31.

The smart speaker 20 performs a confirmation feedback "1000 dpi cannot be specified. Are you sure you want to scan with 600 dpi and send to Tanaka?" (step S259).

In response to such confirmation feedback, the user utters "Yes" (step S260). The communication controller 212 of the smart speaker 20 transmits the voice data to the cloud service apparatus 30 (step S261).

The text converter 312 of the operation voice conversion program 31 converts the voice data into text data (step S262). The interpreter 313 of the operation voice conversion program 31 interprets the text data on the basis of the dictionary information provided from the voice assistant program 32 (steps S263 to S265). Then, the interpreter 313 transmits the interpretation result in which the intent is "SCAN_EXECUTE" and the parameter is "resolution=600 dpi, destination=Tanaka" to the management program 33 (step S266).

The interpretation result converter 331 of the management program 33 converts the interpretation result into a job command (step S267). The execution instructor 332 of the management program 33 transmits the job command to the MFP 10 (step S268).

In addition, the notifier 335 of the management program 33 transmits, response information in which a response "Executing the job" is set, to the smart speaker 20 via the operation voice conversion program 31 (steps S269 to S270).

The voice feedbacker 213 of the smart speaker 20 performs an input confirmation feedback "Executing the job" (step S271). As a result, the MFP 10 can be operated to execute a job within the processing capability by voice input operation.

Here, the MFP 10 refers to an address book stored in the second memory 114 in the MFP 10, thereby searching for the destination information corresponding to "Tanaka". The destination information is information such as a mail address and a fax number. If there is destination information corresponding to "Tanaka" in the address book, the MFP 10 transmits image data scanned by the MFP 10 to the destination. The MFP 10 displays the destination information on the display 103 and prompts the user to confirm whether the destination is correct. When the user selects by pressing the OK button or the like, the scanned image data may be transmitted to the destination. In addition, when there are a plurality of destinations corresponding to "Tanaka" in the address book, the MFP 10 may display all the corresponding destination information on the display 103 of the MFP 10 to allow the user to select the destination information.

Operation for Searching and Printing Print Target

Figure 20:
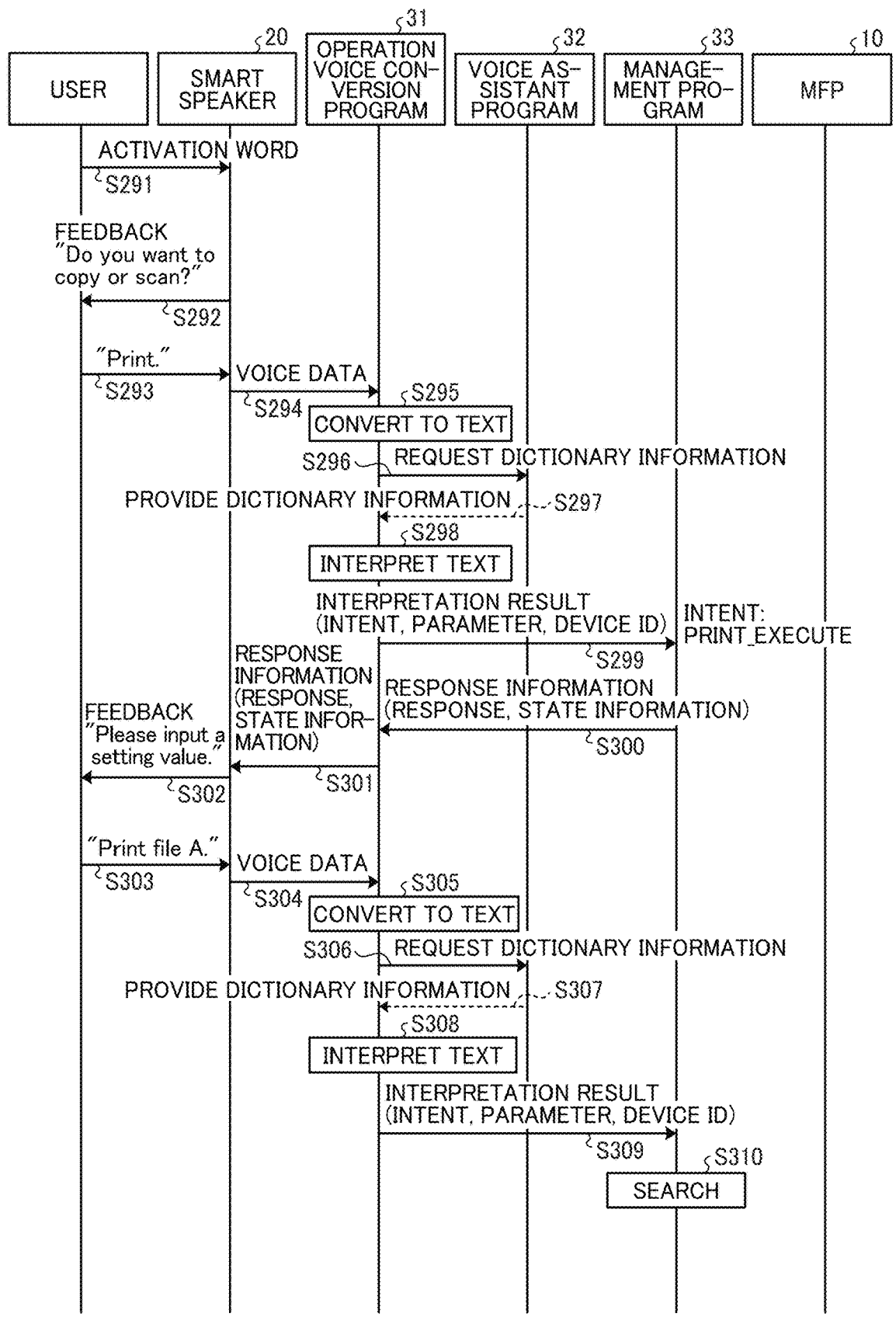
FIG. 20 is a sequence diagram illustrating an example of a search process through a voice operation executed by the voice operation system according to the present embodiment.

Next, an operation for printing a desired file will be described. FIG. 20 is a sequence diagram illustrating an example of a search process by a voice operation executed by the voice operation system 1 according to the present embodiment.

After activating the operation voice processing program 21 of the smart speaker 20, the user instructs the activation of the voice assistant program 32 by, for example, voice input (step S291). As a result, processes same as the processes from steps S21 to step S35 illustrated in FIG. 12 are performed.

The voice feedbacker 213 of the smart speaker 20 performs a voice feedback that prompts a job instruction such as "Do you want to copy or scan?" (step S292). In response to this, the user utters "Print" (step S293).

The communication controller 212 of the smart speaker 20 transmits the voice data to the cloud service apparatus 30 (step S294).

The text converter 312 of the operation voice conversion program 31 converts the voice data into text data (step S295). The interpreter 313 of the operation voice conversion program 31 interprets the text data on the basis of the dictionary information provided from the voice assistant program 32 (steps S296 to S298). Then, the interpreter 313 transmits the interpretation result in which the intent is "PRINT_EXECUTE" to the management program 33 (step S299).

The required parameters are insufficient with only the "Print" instruction, the notifier 335 of the management program 33 transmits, response information in which a response "Please input a setting value" is set, to the smart speaker 20 via the operation voice conversion program 31 (steps S300 to S301). As a result, the voice feedbacker 213 of the smart speaker performs an insufficient input feedback "Please input a setting value" (step S302).

Next, for such insufficient input feedback, the user utters "Print file A" (step S303). The communication controller 212 of the smart speaker 20 transmits the voice data to the cloud service apparatus 30 (step S304).

The text converter 312 of the operation voice conversion program 31 converts the voice data into text data (step S305). The interpreter 313 of the operation voice conversion program 31 interprets the text data on the basis of the dictionary information provided from the voice assistant program 32 (steps S306 to S308). Then, the interpreter 313 transmits the interpretation result in which the intent is "PRINT_EXECUTE" and the parameter is "print target=file A" to the management program 33 (step S309).

The searcher 337 of the management program 33 searches for the file A from the management DB 34 on the basis of the parameter included in the interpretation result (step S310). The search target is not limited to the management DB 34 but may be a server connected to the cloud service apparatus 30 via the network 50. In addition, the searcher 337 may search not only a file name including a character string included in the parameter but also a file including a character string included in a parameter in the file data. Moreover, the searcher 337 may perform a search on the basis of file attributes such as a file creation date and time and a file creator.

Figure 21:
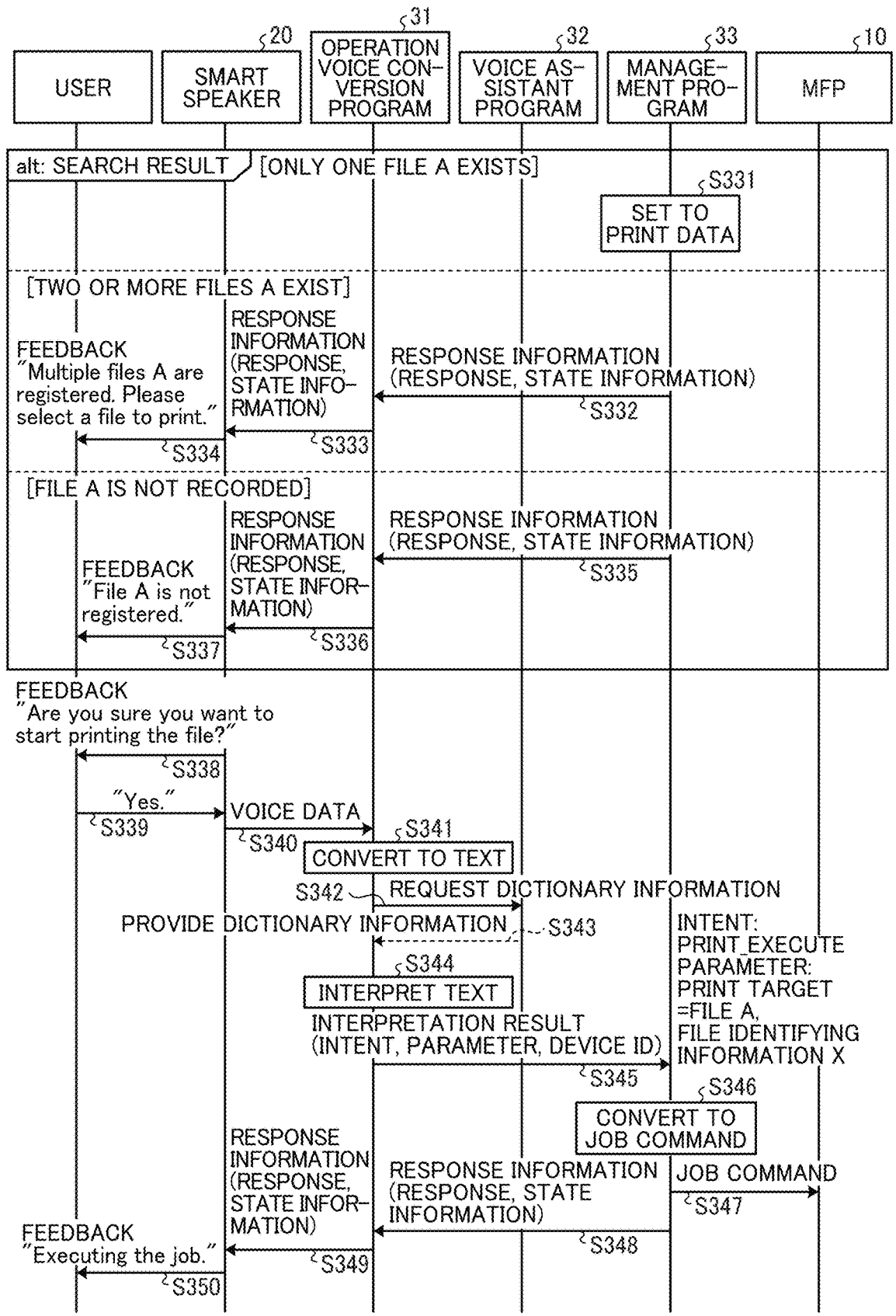
FIG. 21 is a sequence diagram illustrating an example of a print process through a voice operation executed by the voice operation system according to the present embodiment.

FIG. 21 is a sequence diagram illustrating an example of a print process by a voice operation executed by the voice operation system 1 according to the present embodiment.

If only one file A is recorded in the management DB 34, the searcher 337 sets this file A as print data (step S331). In addition, the notifier 335 transmits, as a response, response information "Are you sure you want to start printing the file?" to the smart speaker 20 via the operation voice conversion program 31.

If there are two or more files A in the management DB 34, that is, there is a case where a plurality of files are found as a result of the search by the searcher 337. In this case, the notifier 335 transmits, as a response, response information "Multiple files A are registered. Please select a file to print." to the smart speaker 20 via the operation voice conversion program 31 (steps S332 to S333). In doing so, the notifier 335 may include, in the response information, a file creation date and time, a creator, a thumbnail image, and the like as information for identifying each file.

The voice feedbacker 213 of the smart speaker 20 performs an insufficient input feedback "Multiple files A are registered. Please select a file to print" (step S334). In doing so, the voice feedbacker 213 may perform a voice feedback on a file creation date and time and a creator as information for identifying each file, or may display a file list on the touch panel 207. In addition, the voice feedbacker 213 may display thumbnail images as a file list to prompt the user to make a selection.

In response to this, the user selects a desired file A. That is, the user may utter a file creation date and time, a creator, or the like to select the file, or select the desired file from the file list displayed on the touch panel 207 by a touch operation. The execution instructor 332 transmits the file A selected by the user to the MFP 10 and makes a print request, as described later.

If the file A is not recorded in the management DB 34, the notifier 335 transmits, as a response, response information "File A is not registered", to the smart speaker 20 via the operation voice conversion program 31 (steps S335 to S336). In addition, the voice feedbacker 213 of the smart speaker 20 performs a feedback "File A is not registered" (step S337).

Then, when there is only one file A in the management DB 34, when a file A desired to be printed is selected, or when another file is selected, the notifier 335 transmits response information. That is, the notifier 335 transmits, as a response, response information "Are you sure you want to start printing the file?" to the smart speaker 20 via the operation voice conversion program 31. The voice feedbacker 213 of the smart speaker 20 performs a confirmation feedback, for example, "Are you sure you want to start printing the file?" (step S338).

In response to this confirmation feedback, the user utters "Yes" (step S339). The communication controller 212 of the smart speaker 20 transmits the voice data to the cloud service apparatus 30 (step S340).

The text converter 312 of the operation voice conversion program 31 converts the voice data into text data (step S341). The interpreter 313 of the operation voice conversion program 31 interprets the text data on the basis of the dictionary information provided from the voice assistant program 32 (steps S342 to S343). Then, the interpreter 313 transmits the interpretation result in which the intent is "PRINT_EXECUTE" and the parameter is "print target=file A, file identifying information X" to the management program 33 (step S345). The file identifying information X is added to identify the file A selected by the user when there are two or more files A in the management DB 34, and is information such as a file creation date and time, and a creator.

The interpretation result converter 331 of the management program 33 converts the interpretation result into a job command (step S346). The notifier 335 transmits the job command to the MFP 10 together with the file selected by the user (step S347). This causes the MFP 10 to print the file desired by the user.

Moreover, the management program 33 transmits, response information in which a response "Continuing the job" is set, to the smart speaker 20 via the operation voice conversion program 31 (steps S348 to S349). In addition, the voice feedbacker 213 of the smart speaker 20 performs an input confirmation feedback "Executing the job" (step S350).

In the above description, while a case where the cloud service apparatus 30 searches for a print target and transmits the searched file to the MFP 10 has been described as an example, the present invention is not limited to this. For example, the cloud service apparatus may transmit a job command "print target=file A" to the MFP 10, and the MFP 10 may search for a file corresponding to the file A. In this case, the MFP 10 searches the second memory 114 of the MFP 10 or a server connected to the MFP 10 via the network 50 for a file corresponding to the file A. In addition, if two or more files are found as the result of the search, the MFP 10 displays a file list on the touch panel 207 and prompts the user to select a file. Then, the MFP 10 targets the file selected by the user for the job execution.

Changing Display Language of MFP

Next, changing the language type (display language) of the screen displayed on the display 103 of the MFP 10 will be described.

In the voice operation system 1, the display language of the MFP 10 can be changed by either a first change method using the display 103 of the MFP 10 or a second change method by voice operation of the smart speaker 20. The user can change the display language of the MFP 10 with the use of a desired change method. Hereinafter, the first change method and the second change method will be described.

Figure 22:
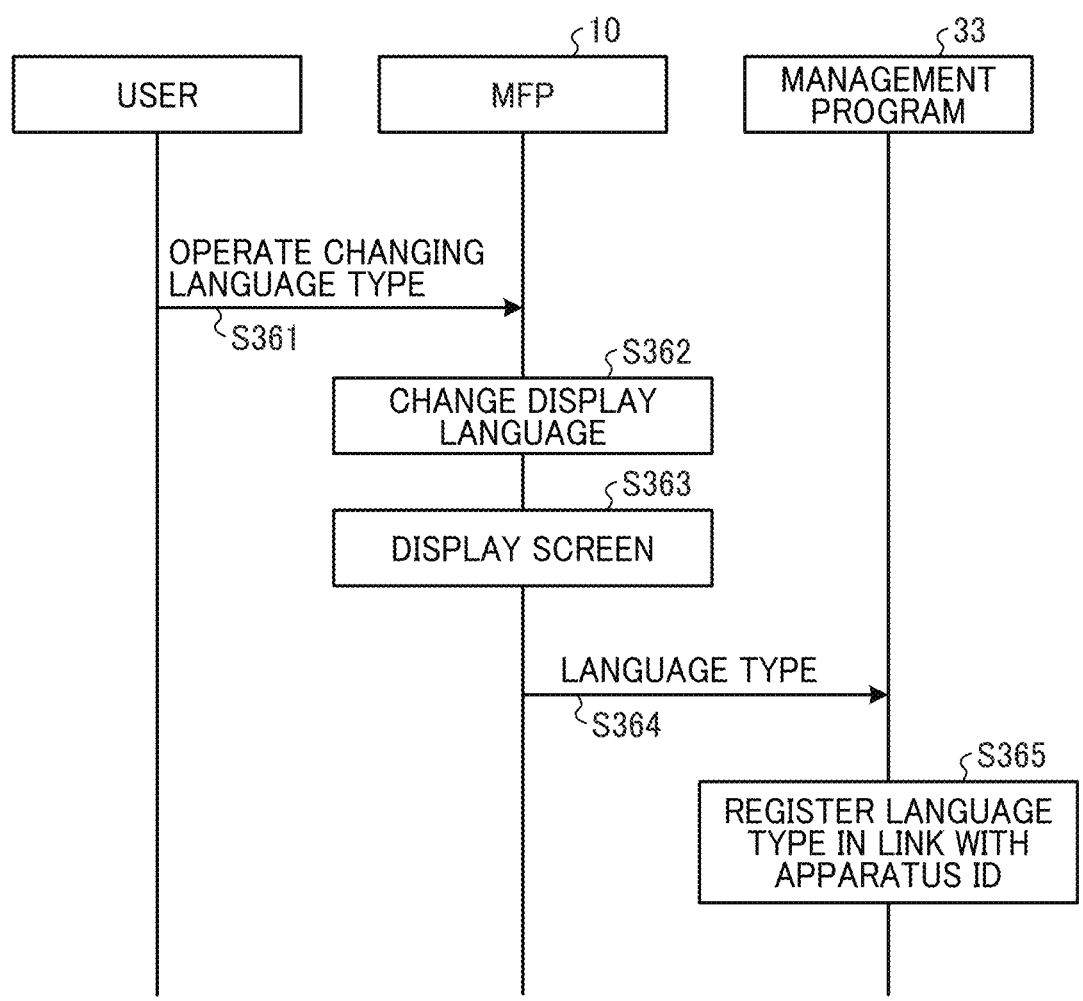
FIG. 22 is a sequence diagram illustrating an example of a display language change process by a first change method executed by the voice operation system according to the present embodiment.

FIG. 22 is a sequence diagram illustrating an example of a display language change process by a first change method executed by the voice operation system 1 according to the present embodiment.

In the first change method, the user performs an operation to change the display language of the MFP 10 to another language type via the display 103 of the MFP 10 (step S361).

When accepting an operation for changing the language type via the display 103, the language setter 123 of the MFP 10 converts the language of various screens displayed on the display 103 into a targeted language (step S362). The display controller 124 controls the display 103 to display a screen expressed in the language type set by the language setter 123 (step S363). In addition, the language setter 123 transmits the changed language type to the cloud service apparatus 30 (step S364).

When receiving the language type from a plurality of external apparatuses including the MFP 10, the equipment information acquirer 333 of the management program 33, in cooperation with the manager 336, links the received language type with the apparatus ID for identifying the external apparatus, and registers the language type in the language setting DB 36 (step S365).

Accordingly, the cloud service apparatus 30 stores and manages the language type of the display language used in the MFP 10 in link with the apparatus ID of the MFP 10. The linking between the language type and the apparatus ID may be performed with the use of the management DB 34 or the linking DB 35. In this case, the equipment information acquirer 333 registers the language type in link with the apparatus ID of the MFP 10 that has transmitted the language type among the apparatus IDs linked with a device ID.

Figure 23:
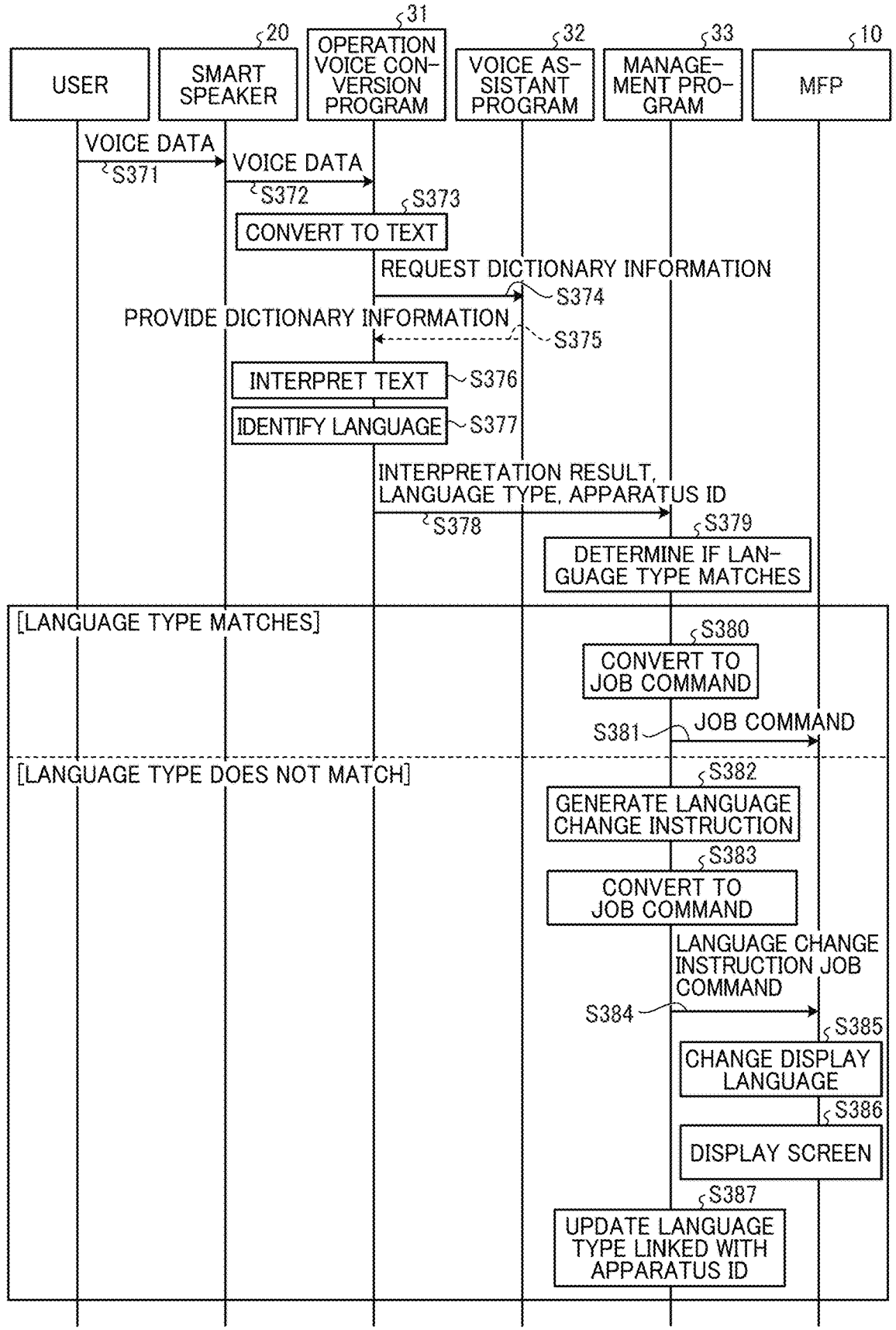
FIG. 23 is a sequence diagram illustrating an example of a display language change process by a second change method executed by the voice operation system according to the present embodiment.

FIG. 23 is a sequence diagram illustrating an example of a display language change process by a second change method executed by the voice operation system 1 according to the present embodiment.

In the second change method, the user utters to the smart speaker 20 to instruct, for example, to change the display language of the MFP 10 to another language type (hereinafter, language change operation voice) (step S371). The communication controller 212 of the smart speaker 20 transmits the voice data of the language change operation voice to the cloud service apparatus 30 (step S372).

In the cloud service apparatus 30, the text converter 312 of the operation voice conversion program 31 converts the voice data into text data (step S373).

The interpreter 313 of the operation voice conversion program 31 interprets the text data on the basis of the dictionary information provided from the voice assistant program 32 (steps S374 to S376). For example, when the text data includes the content of a job to be executed by the MFP 10, such as executing copy, the interpreter 313 interprets the content of the job.

In addition, the language identifier 315 of the operation voice conversion program 31 identifies a word or phrase used to request the change of the display language, a targeted language type, and the MFP 10 to be changed, on the basis of the text data and dictionary information (step S377).

For example, if the language change operation voice is "Switch the display of the MFP to English", the language identifier 315 determines that a change of the display language (language type) has been requested on the basis of the combination of "English" and "Switch" in the language change operation voice, and identifies the targeted language type "English". In addition, the language identifier 315 identifies an external apparatus (apparatus ID) to be changed on the basis of the "MFP" included in the language change operation voice.

The method for identifying the language type is not limited to the above example. For example, the language identifier 315 may identify the targeted language type on the basis of a specific language type set in the smart speaker 20 in advance. In this case, the user utters a language change operation voice or the like to the smart speaker 20 with the use of a language that can be interpreted by the smart speaker 20, that is, a language type (for example, English) set for the smart speaker 20. Then, on the condition that the voice data transmitted from the smart speaker 20 is received or converted into text data, the language identifier 315 identifies the language type set in the smart speaker 20 as the targeted language type.

In addition, for example, the language identifier 315 may identify the language type used by the user in the utterance as the targeted language type. In this case, the user utters language change operation voice to the smart speaker 20 with the use of the targeted language (for example, English). Then, the language identifier 315 distinguishes the language type used in the utterance from the text data of the voice data transmitted from the smart speaker 20 and the like, and identifies the distinguished language type as the targeted language.

Subsequently, the interpreter 313 and the language identifier 315 transmit a job interpretation result, the targeted language type, and the apparatus ID of a subject to be changed to the management program 33 (step S378).

When receiving the job interpretation result, the targeted language type, and the apparatus ID of the subject to be changed from the operation voice conversion program 31, the interpretation result converter 331 of the management program 33 refers to the language type registered in the language setting DB 36 to determine whether the language type matches the targeted language type (step S379).

Specifically, the interpretation result converter 331 refers to the language type linked with the apparatus ID of the subject to be changed to determine whether the language type matches the targeted language type. If the device ID, apparatus ID, and language type are linked and stored in the language setting DB 36 (or the management DB 34, the linking DB 35), the interpretation result converter 331 refers to the language type of a corresponding apparatus ID linked with the device ID of the smart speaker 20 that has transmitted the voice data.

Here, step S380 and step S381 illustrate the flow of operation when the referred language type matches the targeted language type.

If determining that the language types match, the interpretation result converter 331 converts the job interpretation result into a job command (step S380). Then, the execution instructor 332 transmits the job command to the external apparatus (MFP 10) corresponding to the apparatus ID of the subject to be changed (step S381). As a result, the MFP 10 executes the job command received from the management program 33.

In other words, if the language type used in the MFP 10 matches the targeted language type specified by the voice operation, the management program 33 avoids instruction to change the display language, thereby controlling in such a manner that the MFP is not notified of the targeted language type. If a job other than changing the display language is instructed, only the job command of the job is transmitted to the MFP 10.

Meanwhile, steps S382 to step S387 illustrate the flow of operation when the referred language type dos not match the targeted language type.

If determining that the language types do not match, the interpretation result converter 331 generates a language change instruction instructing to change the language setting to the targeted language type (step S382), and converts the job interpretation result into a job command (step S383). The execution instructor 332 transmits the language change instruction and the job command to the external apparatus (MFP 10) corresponding to the apparatus ID of the subject to be changed (step S384). The language change instruction may be generated as a single command sentence, or may be generated as a compound sentence such as a targeted language type+a display language change command.

The language setter 123 of the MFP 10 converts the language of various screens displayed on the display 103 into the targeted language type, on the basis of the language change instruction received from the management program 33 (step S385). The display controller 124 controls the display 103 to display a screen expressed in the language type set by the language setter 123 (step S386). In addition, the MFP 10 executes the job command received from the management program 33.

Then, the equipment information acquirer 333 of the management program 33, in cooperation with the manager 336, updates the language setting linked with the apparatus ID of the subject to be changed to the targeted language type (step S387).

As described above, according to the voice operation system 1 according to the present embodiment, the cloud service apparatus 30 acquires the language type of the display language used for the display from the MFP 10 and stores the acquired language type in the language setting DB 36. When changing the display language is instructed by voice operation via the smart speaker 20, the cloud service apparatus 30 determines whether the language type stored in the language setting storage matches the targeted language type. When the language types do not match, the cloud service apparatus 30 transmits the instruction information for instructing changing the display language to the MFP 10. When the language types match, the cloud service apparatus 30 avoids the transmission of the instruction information.

As a result, if the language type used in the MFP 10 matches the targeted language type specified by the voice operation, the voice operation system 1 does not instruct the MFP to change the language type, and thus can reduce the amount of data between the cloud service apparatus 30 and the MFP 10. In addition, the language type used in the MFP 10 can be made to match the language type set by voice operation, and thus the convenience related to the operation for changing the display language can be improved.

That is, when the same language type as the display language used in the image forming apparatus is specified as the targeted language type via the speaker, for example, unnecessary processing may be avoided. This improves user operability.

In addition, the voice operation system 1 can change the display language of the MFP by voice operation, and thus manual operation is not required and the convenience related to the operation for changing the display language can be improved.

Variation

In the embodiment described above, an example in which the display language of the MFP 10 is changed by voice operation via the smart speaker 20 has been described. In variation, a mode will be described in which changing the display language by voice operation can be enabled or disabled on a per-MFP 10 basis, or on a per-user basis who uses the MFP 10.

Figure 24:
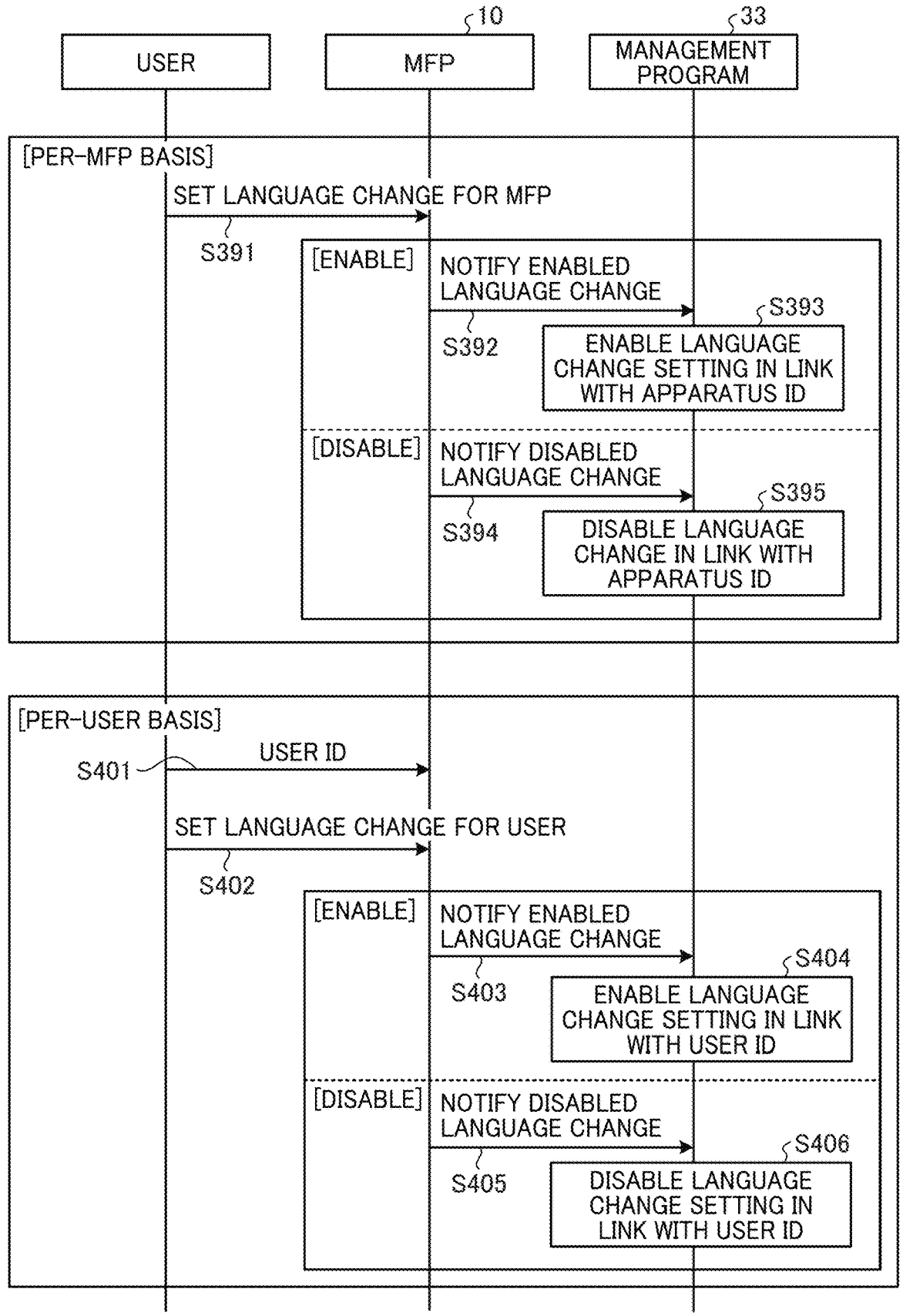
FIG. 24 is a sequence diagram illustrating an example of a setting process for changing a display language executed by the voice operation system according to a variation.

FIG. 24 is a sequence diagram illustrating an example of a setting process for changing the display language executed by the voice operation system 1 according to variation.

Here, steps S391 to S395 illustrate the flow of operation when enabling/disabling changing the display language by voice operation on a per-MFP 10 basis (external apparatus).

The user sets, via the display 103 of the MFP 10, to enable or disable the setting on a per-MFP 10 basis for changing the display language by voice operation (step S391).

Here, when changing the display language is enabled, the language setter 123 of the MFP 10 notifies the cloud service apparatus 30 that changing the display language has been enabled (step S392). Then, upon receipt of the notification from the external apparatus (MFP 10), the equipment information acquirer 333 of the management program 33 enables changing the display language by voice operation, in link with the apparatus ID of the MFP 10 (step S393).

Meanwhile, when changing the display language is disabled, the language setter 123 of the MFP 10 notifies the cloud service apparatus 30 that changing the display language has been disabled (step S394). Then, upon receipt of the notification from the external apparatus (MFP 10), the equipment information acquirer 333 of the management program 33 disables changing the display language by voice operation, in link with the apparatus ID of the MFP (step S395).

In addition, steps 401 to S406 illustrate the flow of operation when enabling/disabling changing the display language by voice operation on a per-user basis who operates the MFP 10 (external apparatus).

The user performs an operation for inputting a user ID with which the user can be identified, via the display 103 of the MFP 10 (step S401). Such operation may be, for example, a login operation for inputting a user ID and a password.

Subsequently, the user sets, via the display 103 of the MFP 10, to enable or disable the setting on a per-user basis for changing the display language by voice operation (step S402).

Here, when changing the display language is enabled, the language setter 123 of the MFP 10 notifies the cloud service apparatus 30, together with the user ID, that changing the display language has been enabled (step S403). Then, upon receipt of the notification from the external apparatus (MFP 10), the equipment information acquirer 333 of the management program 33 enables a language change setting for changing the display language by voice operation, in link with the apparatus ID of the MFP 10 and the user ID (step S404).

Meanwhile, when changing the display language is disabled, the language setter 123 of the MFP 10 notifies the cloud service apparatus 30, together with the user ID, that changing the display language has been disabled (step S405). Then, upon receipt of the notification from the external apparatus (MFP 10), the equipment information acquirer 333 of the management program 33 disables a language change setting, in link with the apparatus ID of the MFP 10 and the notified user ID (step S406).

With the above process, the cloud service apparatus 30 manages the enable/disable setting of changing the display language by voice operation on a per-MFP 10 basis, and manages the enable/disable setting of changing the display language by voice operation on a per-user basis who uses the MFP 10.

In the MFP 10, the display language may be set for each user. In this case, the equipment information acquirer 333 links the language type of the display language set by each user with a corresponding user ID.

Figure 25B:
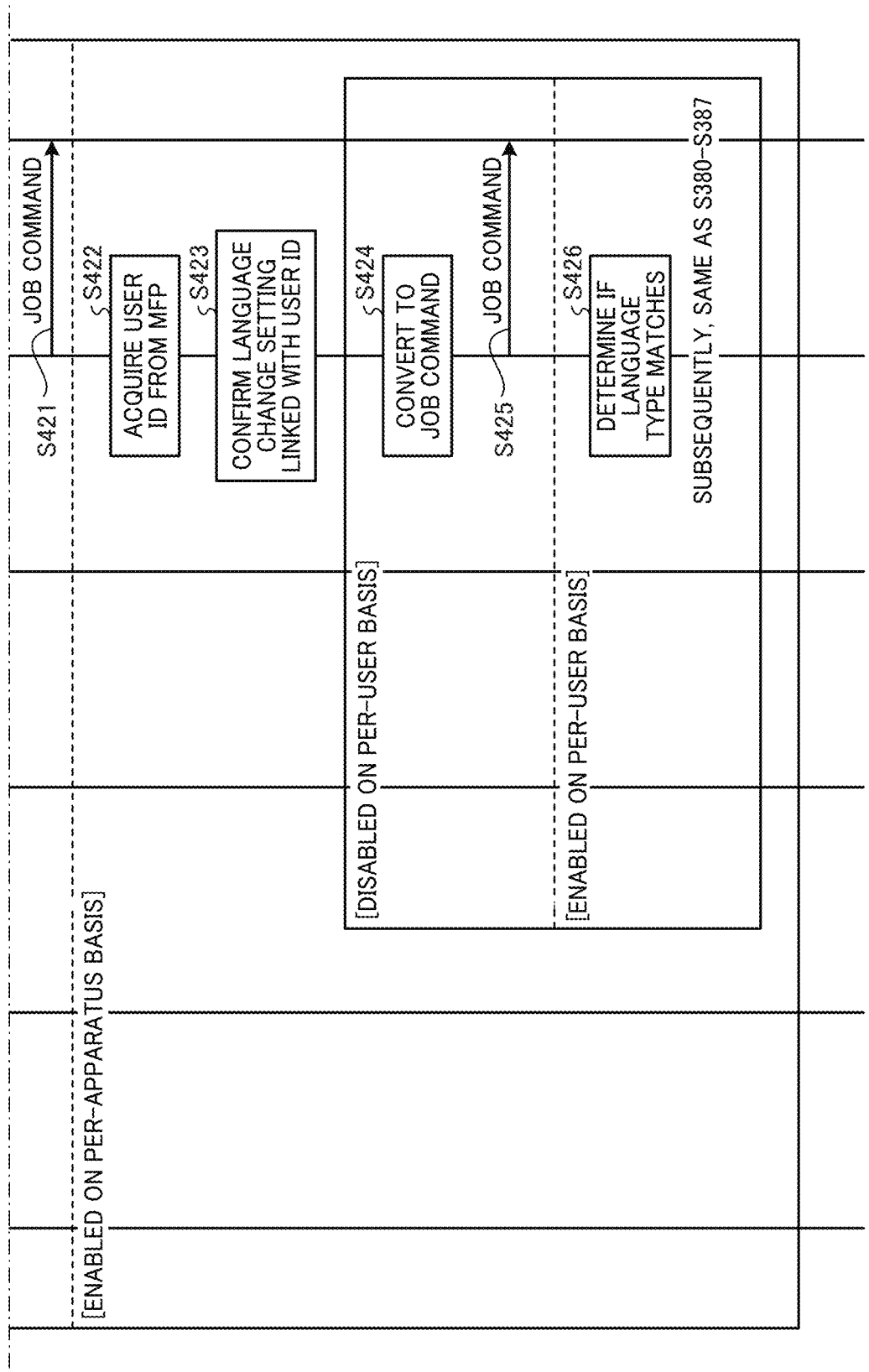

FIG. 25 is a sequence diagram illustrating an example of a display language change process by a second change method executed by the voice operation system 1 according to variation. Steps S411 to S418 are the same as the processes of steps S371 to S378 described with reference to FIG. 23, and thus the description thereof is omitted.

When receiving the job interpretation result, the targeted language type, and the apparatus ID of the subject to be changed from the operation voice conversion program 31, the interpretation result converter 331 of the management program 33 confirms the language change setting linked with the apparatus ID (step S419).

Here, steps S420 and step S421 illustrate the flow of operation when the language change setting is disabled.

If determining that the language change setting linked with the apparatus ID is disabled, the interpretation result converter 331 converts the job interpretation result into a job command (step S420). Then, the execution instructor 332 transmits the job command to the external apparatus (MFP 10) corresponding to the apparatus ID of the subject to be changed (step S421). As a result, the MFP 10 executes the job command received from the management program 33.

In other words, when the language change setting linked with the apparatus ID is disabled, the targeted language type is not transmitted to the MFP 10, and only the job command is transmitted to the MFP 10.

Meanwhile, steps S422 to S426 illustrate the flow of operation when the language change setting linked with the apparatus ID is enabled.

The equipment information acquirer 333 acquires the user ID of the user using the MFP 10 from the external apparatus (MFP 10) corresponding to the apparatus ID of the subject to be changed (step S422). Next, the interpretation result converter 331 confirms the language change setting linked with the user ID acquired by the equipment information acquirer 333 (step S423).

Here, if determining that the language change setting linked with the user ID is disabled, the interpretation result converter 331 converts the job interpretation result into a job command (step S424). Then, the execution instructor 332 transmits the job command to the external apparatus (MFP 10) corresponding to the apparatus ID of the subject to be changed (step S425). As a result, the MFP 10 executes the job command received from the management program 33.

Meanwhile, if determining that the language change setting linked with the user ID is enabled, the interpretation result converter 331 refers to the language type linked with the apparatus ID or the user ID, and determines whether the language type matches the targeted language type (step S426). Then, the voice operation system 1 executes the processes same as steps S380 to S387 described with reference to FIG. 23, thereby changing the display language of the MFP 10 on the basis of the determination result of step S426.

As described above, the voice operation system 1 according to variation can enable or disable changing the display language by voice operation on a per-MFP 10 basis or a per-user basis who uses the MFP 10. Therefore, the voice operation system 1 according to variation can improve the convenience related to the operation for changing the display language.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a TCP/IP signal carrying computer code over an IP network, such as the Internet. The carrier medium may also include a storage medium for storing processor readable code such as a floppy disk, hard disk, CD ROM, magnetic tape device or solid state memory device.

The invention claimed is:

1. A server apparatus communicably connected with a speaker and an image forming apparatus, for controlling operation of the image forming apparatus based on voice operation input via the speaker, the server apparatus comprising circuitry configured to:
acquire, from the image forming apparatus, a language type of a display language used for display at the image forming apparatus;
store, in a memory, an apparatus identifier identifying the image forming apparatus in association with the language type of the display language of the image forming apparatus;
acquire, from the speaker, voice operation including an instruction to change the display language;
identify a language type of a targeted language based on the voice operation;
determine whether the language type of the display language matches the language type of the targeted language stored in association with the apparatus identifier of the image forming apparatus as a subject to be changed;
instruct the image forming apparatus to change from the language type of the display language to the language type of the targeted language, in response to a determination that the language type of the display language does not match the language type of the targeted language; and
omit instructing the image forming apparatus to change the language type of the display language of the image forming apparatus, in response to a determination that the language type of the display language matches the language type of the targeted language.

2. The server apparatus of claim 1, wherein the circuitry is configured to:
specify, based on the voice operation, the apparatus identifier of the image forming apparatus as the subject to be changed.

3. The server apparatus of claim 1,
wherein the circuitry stores, in association with the apparatus identifier, a language change setting indicating whether change of the display language based on the voice operation is enabled or disabled, and
wherein, when the language change setting stored in association with the apparatus identifier of the image forming apparatus as the subject to be changed, indicates that change of the display language based on the voice operation is to be disabled, the circuitry disregards the instruction to change the language type of the display language of the image forming apparatus.

4. The server apparatus of claim 2, wherein the circuitry is further configured to:
acquire, from the image forming apparatus, a user identifier of a user who uses the image forming apparatus;
store, in association with the apparatus identifier, the user identifier of the user who uses the image forming apparatus; and
store, for each user identifier, a language change setting indicating whether change of the display language based on the voice operation is enabled or disabled,
wherein, when the language change setting stored in association with the user identifier associated with the apparatus identifier of the image forming apparatus as the subject to be changed, indicates that change of the display language based on the voice operation is to be disabled, the circuitry disregards the instruction to change the language type of the display language of the image forming apparatus.

5. The server apparatus of claim 1, wherein, when the voice operation includes a job other than the instruction to change the language type of the display language, the circuitry instructs the image forming apparatus to execute the job regardless of whether the language type of the display language matches the language type of the targeted language.

6. The server apparatus of claim 1, wherein the circuitry identifies the language type of the targeted language based on a word or phrase in the voice operation that indicates the language type of the targeted language.

7. The server apparatus of claim 1, wherein the circuitry identifies, as the language type of the targeted language, the language type of a language interpretable to the speaker.

8. The server apparatus of claim 1, wherein the circuitry identifies, as the language type of the targeted language, the language type of a language used for the voice operation.

9. A voice operation system comprising:
the server apparatus of any claim 1;
the speaker configured to receive voice operation from a user; and
the image forming apparatus.

10. The server apparatus of claim 1, wherein the circuitry is configured to,
convert the voice operation from a user into text data,
interpret the instruction included in the voice operation based on the text data,
determine whether the text data matches dictionary information,
convert the text data to an intent indicating an intention of the user and a parameter, in response to a determination that the text data matches the dictionary information,
convert the intent and the parameter into a job execution command interpretable by the image forming apparatus, and
instruct the image forming apparatus to perform the job execution command regardless of the determination of whether the language type of the display language matches the language type of the targeted language, in response to the voice operation including a job other than the instruction to change the language type of the display language.

11. The server apparatus of claim 10, wherein the parameter indicates a job condition associated with the job execution command.

12. A voice operation system for controlling operation of an image forming apparatus based on voice operation input via a speaker, the voice operation system comprising circuitry configured to:
acquire, from the image forming apparatus, a language type of a display language used for display at the image forming apparatus;
store, in a memory, an apparatus identifier identifying the image forming apparatus in association with the language type of the display language of the image forming apparatus;
acquire, from the speaker, voice operation including an instruction to change the display language;
identify a language type of a targeted language based on the voice operation;
determine whether the language type of the display language matches the language type of the targeted language stored in association with the apparatus identifier of the image forming apparatus as a subject to be changed;
instruct the image forming apparatus to change from the language type of the display language to the language type of the targeted language, in response to a determination that the language type of the display language does not match the language type of the targeted language; and omit instructing the image forming apparatus to change the language type of the display language of the image forming apparatus, in response to a determination that the language type of the display language matches the language type of the targeted language.

13. The voice operation system of claim 12, wherein the circuitry is configured to:

specify, based on the voice operation, the apparatus identifier of the image forming apparatus as the subject to be changed.

14. The voice operation system of claim 12, wherein the circuitry is configured to, convert the voice operation from a user into text data, interpret the instruction included in the voice operation based on the text data, determine whether the text data matches dictionary information, convert the text data to an intent indicating an intention of the user and a parameter, in response to a determination that the text data matches the dictionary information, convert the intent and the parameter into a job execution command interpretable by the image forming apparatus, and instruct the image forming apparatus to perform the job execution command regardless of the determination of whether the language type of the display language matches the language type of the targeted language, in response to the voice operation including a job other than the instruction to change the language type of the display language.

15. The voice operation system of claim 14, wherein the parameter indicates a job condition associated with the job execution command.

16. A voice operation method executable on a server apparatus controlling operation of an image forming apparatus based on voice operation input via a speaker, the voice operation method comprising:

acquiring, from the image forming apparatus, information on a language type of a display language used for display at the image forming apparatus;

storing an apparatus identifier identifying the image forming apparatus in association with the language type of the display language;

acquiring, from the speaker, voice operation including an instruction to change the display language;

identifying a language type of a targeted language based on the voice operation;

determining whether the language type of the display language matches the language type of the targeted language stored in association with the apparatus identifier of the image forming apparatus as a subject to be changed;

instructing the image forming apparatus to change from the language type of the display language to the language type of the targeted language, in response to a determination that the language type of the display language does not match the language type of the targeted language; and omitting instructing the image forming apparatus to change the language type of the display language of the image forming apparatus, in response to a determination that the language type of the display language matches the language type of the targeted language.

17. The voice operation method of claim 16, further comprising:

specifying, based on the voice operation, the apparatus identifier of the image forming apparatus as the subject to be changed.

18. The voice operation method of claim 16, further comprising:

converting the voice operation from a user into text data;

interpreting the instruction included in the voice operation based on the text data;

determining whether the text data matches dictionary information;

converting the text data to an intent indicating an intention of the user and a parameter, in response to a determination that the text data matches the dictionary information, converting the intent and the parameter into a job execution command interpretable by the image forming apparatus; and instructing the image forming apparatus to perform the job execution command regardless of the determination of whether the language type of the display language matches the language type of the targeted language, in response to the voice operation including a job other than the instruction to change the language type of the display language.

19. The voice operation method of claim 18, wherein the parameter indicates a job condition associated with the job execution command.

* * * * *